US012483383B2

(12) United States Patent
Drucker et al.

(10) Patent No.: US 12,483,383 B2
(45) Date of Patent: Nov. 25, 2025

(54) APPROXIMATE HOMOMORPHIC CRYPTOGRAPHIC OPERATIONS

(71) Applicant: International Business Machines Corporation, Armonk, NY (US)

(72) Inventors: Nir Drucker, Zichron Yaakov (IL); Hayim Shaul, Kfar Saba (IL)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 18/589,800

(22) Filed: Feb. 28, 2024

(65) Prior Publication Data
US 2025/0274263 A1    Aug. 28, 2025

(51) Int. Cl.
*H04L 9/06*      (2006.01)
*H04L 9/00*      (2022.01)

(52) U.S. Cl.
CPC ............ *H04L 9/008* (2013.01); *H04L 9/0618* (2013.01); *H04L 2209/04* (2013.01); *H04L 2209/12* (2013.01)

(58) Field of Classification Search
CPC ... H04L 9/008; H04L 9/0618; H04L 2209/04; H04L 2209/12
See application file for complete search history.

(56) References Cited

U.S. PATENT DOCUMENTS

| 10,439,798 B2 | 10/2019 | Savry et al. |
| 11,546,134 B2 | 1/2023 | No et al. |
| 2008/0172562 A1 | 7/2008 | Cachin et al. |
| 2021/0391976 A1 | 12/2021 | Sirdey et al. |

OTHER PUBLICATIONS

Bhati et al., Let's Go Evee! A Friendly and Suitable Family of AEAD Modes for IoT-to-Cloud Secure Computation, Association for Computing Machinery, pp. 2546-2560 (Year: 2023).*
Bendoukha et al., Practical Homomorphic Evaluation of Block-Cipher-Based Hash Function with Applications, Springer Foundations and Practice of Security 15th International Symposium, FPS 2023 Ottawa, ON, Canada, pp. 88-103 (Year: 2023).*

(Continued)

*Primary Examiner* — Ellen Tran
(74) *Attorney, Agent, or Firm* — CANTOR COLBURN LLP; Anthony Mauricio Pallone

(57) ABSTRACT

Mechanisms are provided for performing homomorphic cryptographic operations. The mechanisms receive a specification of a homomorphic encryption (HE) operation to be performed on workloads comprising one or more input ciphertexts and generate a circuit of HE computations for performing the HE operation. The circuit comprises authentication tag checking logic at one or more inputs of the circuit, and nullification logic inserted into the circuit. The nullification logic operates to delete one or more HE encrypted ciphertexts received by the circuit. The mechanisms process the workloads by the circuit of HE computations to generate one or more output ciphertexts that are results of the HE operation executed on the one or more input ciphertexts, which are returned to a source computing system. The nullification logic deletes an input ciphertext of the one or more input ciphertexts when the authentication tag is invalid.

20 Claims, 12 Drawing Sheets

(56) References Cited

OTHER PUBLICATIONS

Aharoni et al., E2E near-standard and practical authenticated transciphering, IACR Cryptol, ePrint Arch, 2023, pp. 1-17 (Year: 2023).*

Bendoukha et al, Revisiting Stream-Cipher-Based Homomorphic Transciphering in the TFHE Era, Springer Nature Switzerland, 2022, pp. 19-33 (Year: 2022).*

List of IBM Patents or Patent Applications Treated as Related, Feb. 28, 2024, 2 pages.

Aharoni, Ehud et al., "E2E near-standard and practical authenticated transciphering", 6th HomomorphicEncryption.org Standards Meeting in Seoul, South Korea, Mar. 23-24, 2023, 17 pages.

Bendoukha, Adda-Akram et al., "Optimized stream-cipher-based transciphering by means of functional-bootstrapping", Data and Applications Security and Privacy XXXVII: 37th Annual IFIP WG 11.3 Conference, Jul. 19-21, 2023, 19 pages.

Bendoukha, Adda-Akram et al., "Revisiting Stream-Cipher-Based Homomorphic Transciphering in the TFHE Era", Foundations and Practice of Security 14th International Symposium, FPS 2021, Dec. 2021, 15 pages.

Cheon, Jung H. et al., "Homomorphic Encryption for Arithmetic of Approximate Numbers", 36th International Cryptology Conference (Crypto 2016), Aug. 14-18, 2016, 23 pages.

Cho, Jihoon, "Transciphering Framework for Approximate Homomorphic Encryption", 27th International Conference on the Theory and Application of Cryptology and Information Security, Dec. 6-10, 2021, 46 pages.

Drucker, Nir et al., "Bleach: Cleaning Errors in Discrete Computations over CKKS", 41st International Cryptology Conference (Crypto 2021), Aug. 16-20, 2021, 39 pages.

Kim, Andrey et al., "Approximate Homomorphic Encryption with Reduced Approximation Error", New Jersey Institute of Technology, Samsung Advanced Institute of Technology, Duality Technologies, Dec. 5, 2021, 34 pages.

* cited by examiner

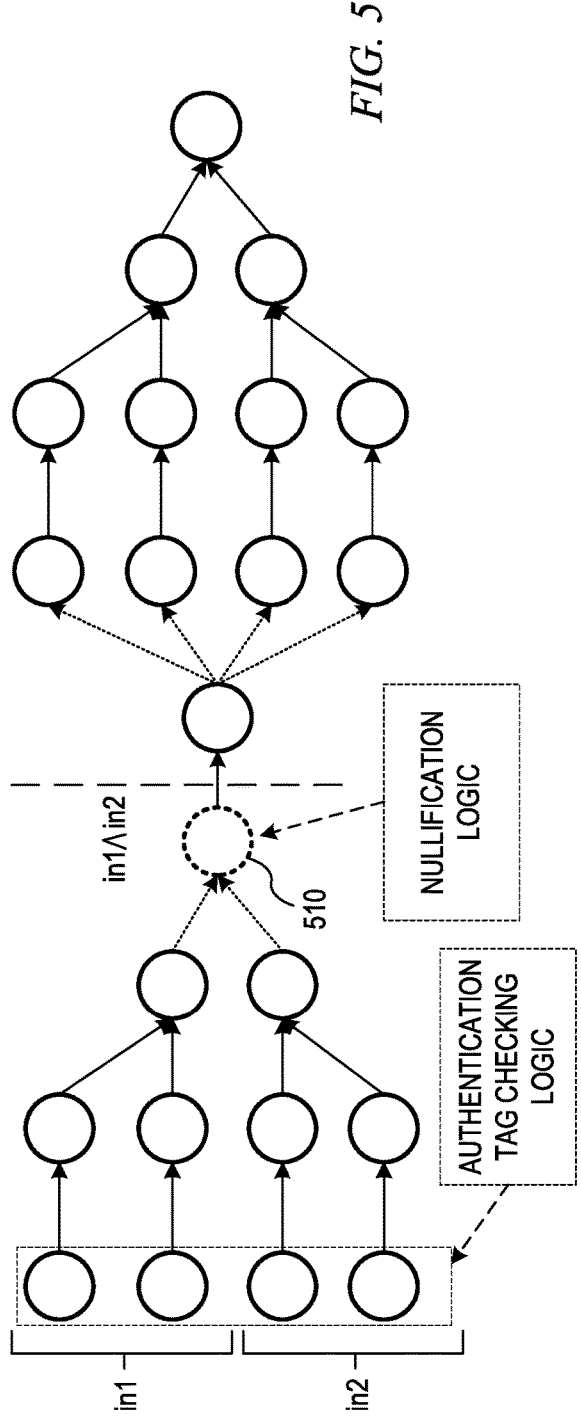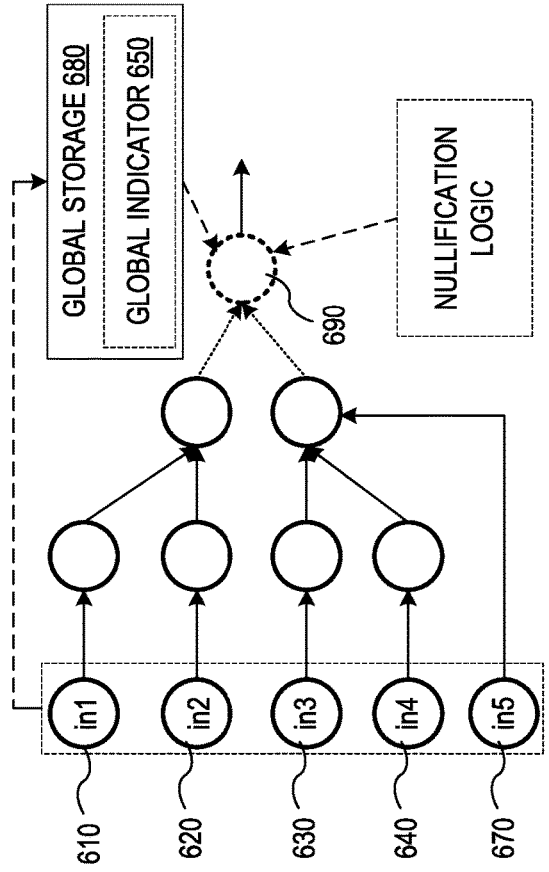

- Let:
  - $n$ be the number of required bits, e.g., 64
  - $e$ the mask bound on the error, e.g., 2^(-30)
  - $c$ the ciphertext to be masked
  - $m$ a multiplexer in $[-e, e]$ or $[1-e, 1+e]$

- One embodiment (Python style):

1. $r[0:n] \xleftarrow{\$}$ generate uniform random $n$ bits
2. $r = r \cdot m$
3. $r_{masked} = r[0] + 2r[1]$
4. for $i \in [2, n)$ :
   1. if i < 12:  ⟵ Defined according to the value of e
      1. $bit = \left(2^{\lfloor i/2 \rfloor} \cdot r[i]\right)^2$
      2. if ($i \bmod 2$): $bit = 2 bit$
   2. else: $bit = 2^{i-4\lfloor i/4 \rfloor} \cdot \left(2^{\lfloor i/4 \rfloor} \cdot r[i]\right)^4$
   3. $r_{masked} \mathrel{+}= bit$
5. return r_masked + c

FIG. 10

APPROXIMATE HOMOMORPHIC CRYPTOGRAPHIC OPERATIONS

STATEMENT REGARDING PRIOR DISCLOSURES BY THE INVENTOR OR A JOINT INVENTOR

The following disclosure(s) are submitted under 35 U.S.C. 102 (b)(1)(A):

DISCLOSURE(S): "E2E near-standard and practical authenticated transciphering", Ehud Aharoni, Nir Drucker, Gilad Ezov, Eyal Kushnir, Hayim Shaul, Omri Soceanu, 6th HomomorphicEncryption.org Standards Meeting in Seoul, South Korea, 23-24 Mar. 2023, 17 pages.

BACKGROUND

The present application relates generally to an improved data processing apparatus and method and more specifically to an improved computing tool and improved computing tool operations/functionality performing approximate homomorphic cryptographic operations.

Cybersecurity is a critical issue in modern computer environments. Each day, new reports are made of attackers breaching computer security measures and gaining access to private or confidential data, such as customer names, contact information, financial information, and the like. Moreover, increasing numbers of events are occurring where attackers infiltrate computing systems and hold the computing system or access to data hostage until a ransom is paid. Thus, improvements to the security of computing systems and data are an ever changing area of technology.

Security of data is especially a concern as individuals and organizations move from an on-site computing infrastructure and local applications/data based architecture to a more distributed and cloud infrastructure/service based architecture where third parties are enlisted to perform processing of individual/organization data. At various points in the cloud architecture, e.g., if a cloud architecture performs data processing on unencrypted data, i.e., "in the clear", sensitive information may be leaked. This can be a significant issue as increasing individuals and organizations rely increasingly on cloud architectures.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided that comprises receiving a specification of a homomorphic encryption (HE) operation to be performed on one or more workloads comprising one or more input ciphertexts. The method further comprises generating a circuit of HE computations for performing the HE operation. The circuit comprises authentication tag checking logic at one or more inputs of the circuit, and nullification logic inserted into the circuit. The nullification logic operates to delete one or more HE encrypted ciphertexts received by the circuit. The method further comprises processing the one or more workloads by the circuit of HE computations to generate one or more output ciphertexts that are results of the HE operation executed on the one or more input ciphertexts. In addition, the method comprises returning the one or more output ciphertexts to a source computing system of the one or more workloads. The nullification logic deletes an input ciphertext of the one or more input ciphertexts when the authentication tag is invalid.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 is an example diagram showing a third solution for performing authentication and sub-circuit based ciphertext invalidation in accordance with one illustrative embodiment;

FIG. 6 is an example diagram showing a fourth solution for performing authentication and sub-circuit based ciphertext invalidation in accordance with one illustrative embodiment;

FIG. 10 is an example diagram illustrating one implementation of a nullification logic of nullification logic blocks that may be inserted into an HE circuit in accordance with one illustrative embodiment.

DETAILED DESCRIPTION

Figure 1:
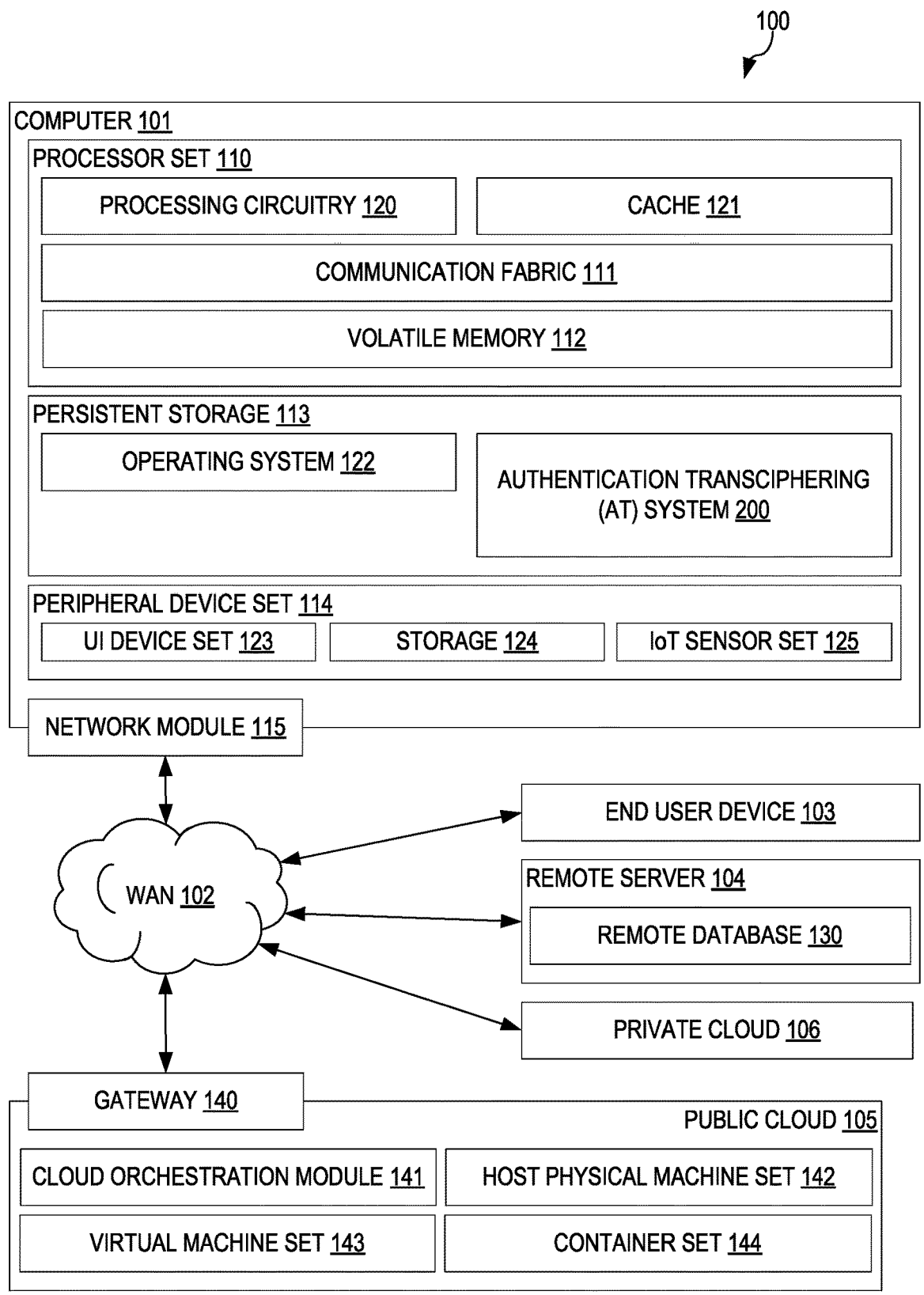
FIG. 1 is an example diagram of a distributed data processing system environment in which aspects of the illustrative embodiments may be implemented and at least some of the computer code involved in performing the inventive methods may be executed.

The illustrative embodiments provide an improved computing tool and improved computing tool operations/functionality for approximate homomorphic cryptographic operations with mask based homomorphic encryption value nullification. It should be appreciated that throughout this description, the term "nullification" means to provide a value that does not leak information regarding the input. For example, nullification may involve setting a value to "null" or zero, or may involve transforming the value to some other value that does not leak information about the input, such as by adding a large random number or the like. Thus, nullification is not limited to just setting the value to "null" or zero.

The illustrative embodiments handle authentication data in an authenticated transciphering computing system, where authenticated transciphering in the context of the illustrative embodiments refers to implementing authentication mechanisms with cryptographic processes where the ciphertexts, or ciphers, move from a first cryptographic mechanism to a different second cryptographic mechanism, such as from symmetric encryption to homomorphic encryption (HE), or the like. While authenticated transciphering will be used as the basis for the description of the illustrative embodiments hereafter, it should be appreciated that there are other embodiments in which the mechanisms of the illustrative embodiments may be implemented, e.g., various other cryptographic or error correcting code based embodiments in which approximate homomorphic encryption (HE) may be implemented and HE values may need to be removed. The scope of the illustrative embodiments and the mechanisms of the present invention are intended to encompass such other embodiments and any embodiments in which approximate HE may be implemented.

The following description provides examples of embodiments of the present disclosure, and variations and substitutions may be made in other embodiments. Several examples will now be provided to further clarify various aspect of the present disclosure.

Example 1: A method, in a data processing system, is provided that includes receiving a specification of a homomorphic encryption (HE) operation to be performed on one or more workloads comprising one or more input ciphertexts, and generating a circuit of HE computations for performing the HE operation. The circuit comprises authentication tag checking logic at one or more inputs of the circuit, and nullification logic inserted into the circuit. The nullification logic operates to delete one or more HE encrypted ciphertexts received by the circuit. The method further includes processing the one or more workloads by the circuit of HE computations to generate one or more output ciphertexts that are results of the HE operation executed on the one or more input ciphertexts. Moreover, the method includes returning the one or more output ciphertexts to a source computing system of the one or more workloads. The nullification logic deletes an input ciphertext of the one or more input ciphertexts when the authentication tag is invalid.

The above limitations advantageously enable the ability to perform homomorphic encryption computations in a circuit which allows for authentication tag checking and propagation of results of that authentication tag checking such that nullification logic can nullify unauthenticated ciphertexts. This functionality is made possible while still providing homomorphic encryption computations that prevent leakage of information regarding the inputs to the circuit.

Example 2: The limitations of any of Examples 1 and 3-10, where the one or more workloads are authenticated transciphering workloads comprising a data encryption that involves conversion of ciphertexts from a first type of cipher to a different second type of cipher. The above limitations advantageously enable a transciphering of workloads with authentication capabilities and the ability to nullify unauthenticated ciphertexts.

Example 3: The limitations of any of Examples 1-2 and 4-10, where the first type of cipher is an Authenticated Encryption with Associated Data (AEAD) cipher and second type of cipher is a homomorphic encryption (HE) cipher, and wherein the one or more input ciphertexts are AEAD ciphertexts converted to HE ciphertexts, and wherein processing the one or more workloads by the circuit of the HE computations comprises processing the HE ciphertexts. The above limitations advantageously enable transciphering between AEAD ciphertexts (or ciphers) and HE ciphertexts (or ciphers) while providing authentication capabilities.

Example 4: The limitations of any of Examples 1-3 and 5-10, where the workloads include one or more authentication tags associated with the one or more input ciphertexts, an encrypted indicator is generated for each input ciphertext and associated authentication tag and is bound to a corresponding HE ciphertext, and the encrypted indicator is included in the HE computations performed by the circuit of HE computations. The above limitations advantageously provide functionality for indicating, in accordance with HE requirements, whether ciphertexts are authenticated or not such that they may be nullified by nullification logic at an appropriate location in the circuit, i.e., by passing with the HE ciphertexts an encrypted indicator.

Example 5: The limitations of any of Examples 1-4 and 6-10, where the HE computations are modified to perform computations based on the encrypted indicators, and where for an HE ADD computation that adds two HE ciphertexts, the HE ADD computation is modified to perform an AND operation on the encrypted indicators associated with the two HE ciphertexts, for an HE MUL computation that multiplies the two HE ciphertexts, the HE MUL computation is modified to perform an AND operation on the encrypted indicators associated with the two HE ciphertexts, and for a HE Rot computation that performs a rotation on a HE ciphertext, the HE Rot computation is modified to perform a HE Rot computation on the encrypted indicator. The above limitations advantageously allow the encrypted indicator to be passed through the circuit from one HE computation to another and corresponding HE computations are performed on the encrypted indicator to ensure that nullification logic in the circuit is able to nullify HE computation results, or HE ciphertexts, that were not able to be authenticated.

Example 6: The limitations of any of Examples 1-5 and 7-10, where the masked input ciphertext is masked based on a random value and a helper function that operate on the input ciphertext that cannot be authenticated to generate a masked input ciphertext. The above limitations advantageously provide functionality for enabling the circuit to still output an HE ciphertext and corresponding encrypted indicator for unauthenticated HE ciphertexts, but where the HE ciphertext is transformed to a nullified or masked ciphertext that does not leak information.

Example 7: The limitations of any of Examples 1-6 and 8-10, where the specification of the HE operation comprises a graph having nodes representing HE ciphertexts and edges representing HE computations. The above limitations advantageously provide a functionality for defining the HE operation as a graph data structure which can then be used to generate the circuit of HE computations.

Example 8: The limitations of any of Examples 1-7 and 9-10, where generating the circuit of HE computations for performing the HE operation further includes receiving configuration parameters specifying tradeoff parameter settings for evaluating a cost function for determining a location to insert the nullification logic into the circuit; configuring the cost function based on the tradeoff parameter settings specified in the received configuration parameters; evaluating the configured cost function for a plurality of locations of the circuit; and selecting a location from the plurality of locations of the circuit based on results of evaluating the configured cost function for the plurality of locations. The above limitations provide a functionality through which one may specify a desired balance between considerations when determining where to locate the nullification logic in the circuit. This provides flexibility and customizability in the determination of how to implement the nullification logic in the circuit.

Example 9: The limitations of any of Examples 1-8 and 10, where the tradeoff parameter settings comprise settings associated with preferences for security and latency preferences which are used to weight elements of the cost function when selecting between a plurality of locations for insertion of the nullification logic, and where tradeoff parameter settings preferring security cause a location relatively closer to a front of the HE circuit to be selected, wherein tradeoff parameter settings preferring lower latency cause a location relatively closer to an end of the HE circuit to be selected. The above limitations provide a functionality that allows for balancing between considerations of security and latency when determining where to locate the nullification logic in the circuit of HE computations.

Example 10: The limitations of any of Examples 1-9, where the receiving and generating operations are performed as part of an offline process of a cloud provider in response to a user of the source computing system requesting the cloud provider provide the HE operation, and wherein the processing and returning are performed as part of an online process of the cloud provider after deploying the HE circuit for use by the user. The above limitations provide a functionality to generate the circuit offline and execute the circuit via a cloud provider at runtime to perform HE operations.

Example 11: A system comprising one or more processors and one or more computer-readable storage media collectively storing program instructions which, when executed by the one or more processors, are configured to cause the one or more processors to perform a method according to any one of Examples 1-10. The above limitations advantageously enable a system comprising one or more processors to perform and realize the advantages described with respect to Examples 1-10.

Example 12: A computer program product comprising one or more computer readable storage media, and program instructions collectively stored on the one or more computer readable storage media, the program instructions comprising instructions configured to cause one or more processors to perform a method according to any one of Examples 1-10. The above limitations advantageously enable a computer program product having program instructions configured to cause one or more processors to perform and realize the advantages described with respect to Examples 1-10.

As touched on above, transciphering is a data encryption process in which a ciphertext moves between ciphers. The present description will focus primarily on transciphering in which ciphertexts are converted from a symmetric cipher to a homomorphic encryption ciphertext upon which homomorphic encryption computations may be performed, however the illustrative embodiments are not limited to this particular transciphering and can involve any transciphering involving homomorphic encryption. Homomorphic encryption is a valuable tool in cases where the security of the inputs is to be maintained and data leakage to unauthorized parties is to be avoided, such as in the case of third-parties being engaged to perform such computations and provide results.

For example, financial and health organizations are continuously searching for information technology (IT) solutions with advanced capabilities while aiming to reduce their costs. One example of such solutions is utilizing cloud environments that offer relatively cheaper storage and computing services compared to setting up and maintaining similar services in-house. However, the use of these third-party services offers the possibility of data leakage or divulging of sensitive or private information. Furthermore, the use of such third party services, such as cloud services, can be restricted by the need to comply with government regulations which require measures to ensure data privacy, such as General Data Protection Regulation (GDPR) and Health Insurance Portability and Protection Act (HIPPA).

Modern cryptography provides useful and standardized solutions for ensuring the confidentiality and integrity of organizations' data in transit or at rest, e.g., through the use of Transport Layer Security (TLS) 1.3 and/or using Advanced Encryption Standard (AES)-Galois/counter mode (GCM), respectively. While the combination of these solutions allows users to take advantage of the storage services provided by the cloud, they do not provide a secure way to utilize the third party services and infrastructure, e.g., cloud computing services and infrastructure, to perform computations and provide results because the computations themselves are done in the clear, i.e., on decrypted data.

One cryptographic solution to the above issue which has gained popularity is homomorphic encryption (HE). HE, or Fully Homomorphic Encryption (FHE), enables computations to be performed on encrypted data. Studies on HE primarily focus on demonstrating the practicality of HE for specific use cases, such as performing classification through inferencing over deep neural networks. These studies often assume an ephemeral application, where data is encrypted using HE, uploaded to an untrusted environment for HE computation, and the results are promptly returned to the user for decryption. However, in reality, the situation becomes more complex when users need to store their data encrypted at one point in time and use it by the third party service/infrastructure, e.g., cloud computing system, for computation at a later point in time. In such cases, the large size of HE ciphertexts can result in extra storage and transmission costs. For instance, HE ciphertexts may have an expansion ratio of more than 2:1 compared to storing the original plaintext, or compared with the 1:1 compression ratio when using symmetric encryption, such as AES. These costs impact not only the storage "at rest" but also the bandwidth required for uploading and downloading the data to and from the cloud computing system.

Hybrid encryption, also known as transciphering, enables the encryption of data using symmetric block ciphers, which can then be transmitted and stored in the cloud without the aforementioned additional storage requirements of HE ciphertexts. Subsequently, the encrypted data can be moved to a third party computing service, e.g., a cloud computing system, that employs HE. Through hybrid encryption, or transciphering, the service effectively "replaces" the encryption scheme from symmetric encryption with the subsequent HE encryption. Once the data is encrypted using HE, the service can perform computations on the encrypted data using HE based computations, and return the encrypted results to the user or store them for future use.

One limitation of such hybrid or transciphering encryption mechanisms is that they only operate on symmetric block ciphers and do not support authentication mechanisms for authenticating that the ciphertexts have not been tampered with. That is, symmetric block ciphers do not provide the ability to authenticate the ciphertext itself using authenticated encryption, unless an additional authentication mechanism is incorporated, in which case the mechanism is referred to as authentication encryption (AE). As a result, an attacker may modify bits of the symmetric encryption plaintext message/encrypted ciphertext and cause incorrect results to be generated. Moreover, because HE operates on encrypted inputs, and the HE mechanisms do not have access to the decrypted inputs, it is not possible through HE to perform such authentication as the HE mechanisms do not have access to the actual unencrypted inputs that are to be authenticated.

In view of these limitations, it would be beneficial to provide a hybrid or transciphering computing tool that enforces authenticity checks of the input data, such as in the case of Authenticated Encryption with Associated Data (AEAD) encryption schemes, yet also leverages the security of HE computing tools that perform operations on encrypted data. An AEAD scheme is a symmetric encryption with authenticity checks. The function gen( ) of an AEAD encryption scheme generates a symmetric key k. The function enc_k(n, a, m) receives the symmetric key k, a nonce n, some additional data a, and a message m that is to be encrypted, and encrypts m into a ciphertext c while also outputting a message authentication tag t over (a, c). The decrypt function dec_k(n, a, c) receives the symmetric key k, the nonce n, and the ciphertext c and performs a check of a message authentication code (MAC) or other function f that compresses a and c to a tag (e.g., hash function with a secret key). That is, the check may be to compare the tag generated from the function f(a, c) with the authentication tag t to determine if there is a match. If there is not a match to the tag t, the decrypt function outputs \perp (a null value); otherwise, it outputs the decryption of the ciphertext c, i.e., the message m.

From the above, it can be seen that the AEAD encryption/decryption has to have access to the tag t to check the bits of the ciphertext (a and c) to make sure the bits have not been changed or otherwise tampered with. This means that AEAD also needs to have the key k to compute the tag for f(a, c) for authentication. However, in HE, all of the input data is encrypted and the HE mechanisms do not have access to the key k to decrypt. Thus, mechanisms need to be provided to allow for authentication of the data with respect to the tag t while still being able to react to situations efficiently during HE computations where the encrypted inputs are determined to not be able to be authenticated based on the tag t, i.e., the tag t does not match the inputs and thus, tampering may have been involved.

If one is to extend the hybrid or transciphering mechanism to support authenticity checks of the input data, i.e., provide an Authentication Transciphering computing tool, the ability to nullify the results of operations performed on inputs that cannot be authenticated should be able to be achieved with the AT computing tool. For example, upon receiving a "bad" tag, i.e., a tag t that cannot be properly authenticated (i.e., matched) to the inputs to authenticate that the inputs have not been tampered with, computations that depend on that potentially tampered with ciphertext corresponding to the "bad" tag should be discarded/cleaned/manipulated. However, under HE it is impossible to nullify or discard computations due to the oblivious nature of the computation requirements. That is, because the values are all encrypted and the calculations are performed on the encrypted data, it is not possible to know the contents of the data before performing the computations without being able to decrypt the encrypted data, which is contrary to the requirements of HE and defeats the purpose of using HE in the first place.

Thus, it would be beneficial to have an Authentication Transciphering (AT) computing tool and computing tool operations/functionality, e.g., an AT computing tool/functionality that is able to utilize the authentication mechanisms of an AEAD encryption tool, yet provide the protections of the inputs made possible through HE encryption. That is, it would be beneficial to have an improved computing tool and improved computing tool operations/functionality that performs AEAD+HE encryption/decryption, which is able to perform authenticity checks with encrypted data and, upon receiving a bad tag, nullifying, e.g., discarding, cleaning, or manipulating the ciphertext(s), and/or the circuit (group of encrypted data computations), or sub-circuit of computations in the circuit, that depend on the associated ciphertexts that fail the authenticity checks.

The illustrative embodiments provide such an improved AT computing tool and computing tool operations/functionality. The AT computing tool of the illustrative embodiments receives several ciphertexts with their associated nonces, additional data, and tags, e.g., AEAD encrypted ciphertexts with their associated nonces, additional data, and tags, where the tags are authentication tags used to authenticate the contexts of the ciphertexts, e.g., the original messages or data encrypted into the ciphertexts. These authentication tags may be, for example, digital signatures, hashes of the contents of the ciphertext, or the like, such that if the contents of the ciphertext, or the ciphertext itself, are tampered with, the ciphertext/contents of ciphertext will not match the expected ciphertext/content defined by the authentication tags and thus, the content (also referred to as a "message") of the ciphertext, or the ciphertext itself, will not be able to be authenticated and the tag is considered a "bad" tag. In this way, the tags serve as authentication mechanisms by performing an operation to authenticate the ciphertext based on the tag and then nullify the ciphertext should the tag and the ciphertext not match, i.e., the tag is a "bad" tag. Both the operation to check the authentication tag and to perform the nullification, which may involve a plurality of multiplication operations to destroy the original ciphertext and/or message, introduce latency into the overall computations being performed and thus, the proper location of these operations may be critical to performance of the overall AEAD+HE computations performed by the AT computing tool.

In addition, the AT computing tool receives a circuit to be evaluated under Homomorphic Encryption (HE). The "circuit" is the group of computations or calculations that are to be performed on the encrypted data using HE. That is, for example, one may want to perform a particular operation on input data, where this operation may require a plurality of HE computations to be performed in series and/or parallel to ultimately generate one or more results corresponding to the requested operation. These HE computations may be represented as a graph of nodes and edges proceeding from inputs to one or more outputs with intermediate nodes and intermediate ciphertexts being generated as a result of the HE computations performed at the various stages along the graph. For example, edges in a graph may represent HE computations and nodes in the graph may represent ciphertexts. The combination of these nodes and edges may be considered a "circuit" that defines the various HE input ciphertext(s), the intermediate ciphertext(s), and the output ciphertext(s).

In addition to the ciphertexts, tags, and circuit, the AT computing tool may receive configuration parameters specifying various tradeoff parameter settings for use in evaluating cost functions for locating nullification logic blocks, and optionally bootstrap logic blocks, in the specified circuit, as will be described in greater detail hereafter. These configuration parameters may specify preferences for security, latency, memory usage, or other performance criteria which are used to weight or evaluate the various elements of a cost function when choosing between a plurality of possible locations for insertion of nullification logic blocks, and in some cases bootstrapping logic blocks, into the given circuit. It should be appreciated that different users, e.g., individuals, organizations, or the like, may have different configuration parameters specifying their particular priorities with regard to these various performance criteria, such that the performance of the AT computing tool may be customized to each user.

The AT computing tool, in an offline phase, analyzes the circuit, based on the configuration parameters, and determines appropriate locations to apply the authentication of the tags and the location of where to perform a responsive action, if necessary, based on the results of the authentication, e.g., discarding, cleaning, or manipulating the set of operations in the circuit so as to clean the computations from that point on in the circuit. As an example, this offline phase may be performed when a new circuit is being deployed for use. As an example, an organization may wish to have their data processed by a third party provider, such as a cloud computing service or cloud infrastructure provider, and may define the operation to be performed, which may be defined as a circuit or otherwise converted to a circuit comprising a plurality of HE computations that together perform the requested operation. For example, an organization may employ a cloud computing service to perform payment processing for the organization, and this payment processing may involve multiple computations performed on various input data, where this input data is to remain secure and the computations not performed in the clear. Thus, a circuit of HE computations may be defined or generated that specifies the various sequences and branches of HE computations going from HE encrypted input(s) to HE encrypted output(s), with optionally one or more intermediate ciphertexts being generated and processed due to the HE computations.

The determination of the appropriate locations to apply authentication of the tags and performing the responsive action depends on the particular embodiment of the invention employed, as will be described hereafter. It should be appreciated that the checking of the authentication tags may be performed at a different location in the circuit than the operation for nullifying the ciphertexts, and/or operations dependent on the ciphertexts, that are determined to be not authenticated. That is, the authentication tag is specific to the AEAD encrypted data or message and thus, the checking of the authentication tag will be performed at a location in the circuit where the AEAD encrypted data or message may be accessed in order to be able to perform the authentication against the tag. The nullification operation, however, may be performed at a different location where the nullification is performed in an optimal manner in accordance with the provided configuration parameters. In some cases, this may occur at the input of the circuit, at the output of the circuit, or at some intermediate location within the circuit. The offline phase determines this optimal location and inserts the nullification logic into the circuit at the determined location such that a modified circuit is generated and used during the online phase.

Subsequently, during an online phase, the AT computing tool uses the results of determining the appropriate selected locations, and thus, the modified circuit, to achieve AT operations which combine the encryption authentication mechanism with the Homomorphic Encryption (HE) based computations. For purposes of illustration, it will be assumed that an AEAD-HE transciphering is performed in the illustrative embodiments, although any encryption authentication mechanism in combination with any homomorphic encryption mechanism may be used to provide the AT computing tool augmented with the additional tools and functionality of the illustrative embodiments as described herein. It is both the encryption capability that provides confidentiality and the encryption authentication mechanism that provides integrity that are required to create an AT mechanism.

As noted above, the illustrative embodiments may apply the knowledge gained through the offline phase of operation, which identifies the selected locations in the circuit to apply authentication of the tags, where the application may take various forms depending on the desired implementation. For example, in some illustrative embodiments, in response to reading the AEAD ciphertexts and associated tags at the input of the circuit, the illustrative embodiments check whether the tags are valid, i.e., indicate that the corresponding ciphertext/content of the ciphertext has not been tampered with, and if the ciphertext cannot be authenticated as having not been tampered with, i.e., has a "bad" tag, the associated HE ciphertext data is nullified, e.g., deleted. This may occur, for example, at the beginning of the circuit or at a location near the beginning of the circuit, with the subsequent entire branches of the circuit, which depend on the unauthenticated ciphertexts, may be implicitly invalidated, as due to the oblivious nature of the HE operations, an outside observer will not see a difference. This achieves a higher security as the potentially problematic ciphertexts are nullified early in the HE computations and avoids situations where an attacker may have gain access to a memory storing such tampered with ciphertexts. However, the early location in the HE circuit may be less efficient as the nullification at this stage may introduce additional latency or overhead in the performance of the HE computations.

In some illustrative embodiments, in response to reading the AEAD ciphertexts and associated tags, an encrypted indicator is generated for each AEAD ciphertext indicating whether its associated tag is valid or not, i.e., authenticated or not, or put another way, whether or not the associated authentication tag is a "bad" tag or not. In some illustrative embodiments, as approximated HE is implemented, the encrypted indicator may also have some error. This encrypted indicator is bound with the corresponding HE ciphertext. Whenever an operation, e.g., addition/multiplication/rotation (ADD/MUL/Rot) is performed as part of the circuit of computations or operations, the indicator is included as part of the computations such that the "bad" tag indicator or good tag indicator can be passed to the point in the circuit where nullification of the ciphertext, circuit, or sub-circuit can be performed based on the state of the tag. For example, the following are example HE computations that may be performed in a circuit of HE computations, where these HE computations are modified to include the indicators of the illustrative embodiments, which facilitate authentication with HE computations:

For an ADD computation: $(c3, in3)$=Add$((c1, in1), (c2, in2))$ compute $c3$=HE.ADD$(c1, c2)$ and $in3$=$in1*in2$ i.e., ($in1$ AND $in2$).

For a MUL computation: $(c3, in3)$=Mul$((c1, in1), (c2, in2))$ compute $c3$=HE.MUL$(c1, c2)$ and $in3$=$in1*in2$ i.e., ($in1$ AND $in2$).

For a Rot computation: $(c3, in3)$=Rot$((c1, in1))$ compute $c3$=HE.Rot$(c1)$ and $in3$=HE.Rot$(in1)$ where $c1$, $c2$, $c3$ are ciphertexts, $in1$, $in2$, $in3$ are authentication indicators whose values are set based on whether an authentication tag matches the input ciphertext/message, and are associated with the corresponding ciphertexts $c1$, $c2$, and $c3$, respectively, and HE.ADD, HE.MUL, and HE.Rot are homomorphic encryption addition, multiply, and rotation operations that are modified to handle the authentication indicators as parameters. In some illustrative embodiments, the authentication indicators comprise a Boolean value, e.g., "0" or "1", to indicate whether a corresponding authentication operation resulted in a finding that the ciphertext/content of the ciphertext is authentic (e.g., a 1 value) or is possibly tampered with (e.g., a 0 value). The illustrative embodiments are not limited to Boolean values and any value may be used that conveys authenticity or potentially tampered with states of the corresponding ciphertext/content of the ciphertext. Moreover, in some cases, the authentication indicator may be a vector of a plurality of authentication indicators.

The authentication indicator, in accordance with the HE requirements, is also encrypted, or can be the results of encrypted HE computation and thus, also encrypted, and thus, the HE computations do not have access to the value of the encrypted authentication indicator. The value of the authentication indicator is set at the time when the authentication tag is evaluated using AEAD authentication operations, and then encrypted using HE. It is only when the nullification logic checks the status of the encrypted authentication indicator that the value of the authentication indicator is determined and nullification is or is not performed based on this value.

With the ADD computation, it can be seen that the two ciphertexts $c1$ and $c2$ are added to generate ciphertext $c3$ using the HE.ADD computation, and the illustrative embodiments add the ability to handle the authentication indicators $in1$ and $in2$ accompanying the ciphertexts $c1$ and $c2$ to generate an authentication indicator $in3$ of the ciphertext $c3$, where the authentication indicator $i3$ is the product of the indicators $in1$ and $in2$ of the input ciphertexts $c1$ and $c2$. Thus, if either of $in1$ or $in2$ is a "0", indicating that there was a mismatch between the authentication tag and the ciphertext or message of the input ciphertext, then the resulting indicator $in3$ will be "0", which indicates that somewhere in the circuit, the input could not be authenticated and thus, the circuit/sub-circuit dependent upon these ciphertexts needs to be nullified, i.e., the results of the computation not relied upon due to the potential tampering with the inputs. Similarly, with the MUL computation, it can be seen that the two ciphertexts $c1$ and $c2$ are multiplied to generate ciphertext $c3$ using the HE.MUL computation, and the illustrative embodiments add the ability to handle the authentication indicators $in1$ and $in2$ accompanying the ciphertexts $c1$ and $c2$ to generate an authentication indicator $in3$ of the ciphertext $c3$, where again the authentication indicator $i3$ is the product of the indicators $in1$ and $in2$ of the input ciphertexts $c1$ and $c2$.

With the Rot computation, the handling of the ciphertext and authentication indicator is different from that of the other two examples in that there is only one ciphertext input and one corresponding authentication indicator, which may itself be a vector of a plurality of indicators. In the case of the Rot computation, the HE.Rot computation is applied to both the input ciphertext $c1$ and the authentication indicator $in1$ separately to thereby generate the corresponding output ciphertext $c3$ and associated authentication indicator $in3$.

It should be appreciated that these are only example homomorphic encryption computations that may be augmented with the mechanisms of the illustrative embodiments to handle authentication indicators. Other HE computations may be likewise modified to include handling of authentication indicators so that the information that one of the input ciphertexts relied upon by upstream computations in the circuit could not be authenticated, may be passed along with each HE computation until a point at which nullification is performed is reached, which may be at the beginning of the circuit, at the end of the circuit, or at some intermediate location of the circuit.

In some illustrative embodiments, similar to the previous example embodiment, the AT computing tool may generate authentication indicators (or simply "indicators") for inputs and defer nullification to a later point in the circuit. This later point in the circuit may be at the end of the circuit, i.e., at an output stage of the circuit which looks to the authentication indicator for each output ciphertext and determines whether it needs to be nullified or not, i.e., if any of the HE computations of the circuit indicate that upstream input ciphertexts were unauthenticated, then all of those computations are nullified at the ciphertext output by nullification logic inserted at the output of the circuit.

In some illustrative embodiments, this later point may be an intermediate point along the circuit where nullification is determined to be the most efficient.

As a rule of thumb, it is better to discard (nullify) "bad data" as soon as possible to avoid reliance on this bad data. With regard to the illustrative embodiments, if an adversary of an AEAD scheme sees the decryption of an unauthenticated plaintext, the adversary may use this information, which leads to AEAD schemes forbidding releasing this data. Once the data is decrypted under HE, a malicious adversary may steal a ciphertext that contains this data and somehow fool the HE decryption mechanism to decrypt and use it. The more time the unauthenticated data is in memory and the more replications or derivations of the unauthenticated data due to the progress of the circuit evaluation, the more opportunities the adversary has. Nullifying data as early as possible reduces the attack surface and thus reduces the opportunities of an adversary to acquire the data.

Thus, it should be appreciated that nullification closer to the beginning of the circuit provides greater security as the potentially tampered with ciphertext is not maintained in memory as long and other operations will not be performed on potentially tampered with ciphertexts. However, nullification is a costly process, and in some cases, may involve multiple multiplication operations. With larger sized ciphertexts at the beginning of the circuit in some cases, this nullification is more costly in terms of computation resources and latency nearer the beginning of the circuit. On the other hand, while nullification at the output of the circuit, in some cases this would entail smaller ciphertexts and thus, less costly nullification operations, security may be much lower as the potentially tampered with ciphertexts must remain in memory longer and may potentially affect other computations and operations. At an intermediate point, there is a tradeoff between these considerations of security and computation latency, as well as other potential performance and security factors.

In some illustrative embodiments, the AT computing tool identifies an intermediate point in the circuit where nullification would be most efficient based on configuration parameters specifying priorities of tradeoff factors, e.g., security, latency, memory usage, power consumption, throughput of the intermediate computations, and the like. These configuration parameters may further specify considerations of multiple systems with different requirements and assumptions, e.g., a first computing system may be permitted to handle unauthenticated data, while a second computing system assumes that nullification has already been performed on "bad data" such that the load and characterization of these systems may be represented in configuration parameters specifying the tradeoff factors.

With this embodiment, the AT computing tool computes, for each node of the circuit, the number of operations required if the tag would be applied at the different nodes in the circuit and chooses the one that minimizes costs, such as security, latency or memory usage costs. A cost function may be defined that weights these various costs, or tradeoff factors, when evaluating possible locations within the circuit where the nullification logic may be inserted to perform efficient nullification of computations dependent upon unauthenticated ciphertexts. This solution may utilize a minimal cut algorithm that chooses a minimal cut in which applying the nullification operation to ciphertexts that are unauthenticated or depend on an upstream unauthenticated ciphertext, minimizes the costs, such as security costs, latency costs, or memory costs. The cost function itself that is used to determine the minimal cut locations may take many different forms including a computation of the number of nodes in a graph of the circuit that would need to have the nullification operation applied to them, to a more computation involving the number of nodes as well as various cost factors based on the locations of the nodes within the circuit, e.g., nodes closer to the beginning of the circuit provide less security costs (or provide higher security) than nodes closer to the end of the circuit, however nodes closer to the beginning of the circuit introduce greater latency due to the nullification operation than nodes closer to the end of the circuit.

Each potential cut location may be evaluated according to the cost function and ranked relative to one another based on the costs. This may mean that in some cases, locations where there are more nodes than other locations may be selected as the minimum cut location even though it requires more nodes to be nullified, as other factors may make the location a better choice, especially taking into account the customized configuration parameters specifying the priority of the costs or tradeoff parameters specified by the particular user. Based on this evaluation, the nullification logic may be automatically inserted into the circuit at the selected location to thereby modify the circuit to include not only the check of the authentication tag and generation of the authentication indicator at the inputs, but also the nullification logic at an intermediate point, or even at an end or output of the circuit.

In some illustrative embodiments, when generating the authentication indicators in response to reading the AEAD ciphertexts and associated authentication tags, an encrypted indicator for all of the input AEAD ciphertexts is generated by ANDing all the authentication indicators together and storing the combined authentication indicator in a global location. Whenever a new AEAD ciphertext is read, its corresponding authentication indicator may be ANDed to the combined authentication indicator which is stored in the global location. Prior to sending specific ciphertext results to the user, the combined indicator stored in the global location may be checked to determine if the result ciphertext is valid or not, i.e., is or is not based on a ciphertext that could not be authenticated. In this way, if the combined authentication indicator indicates that any one ciphertext was found to be unauthenticated, the result ciphertext can be nullified before sending it to the user. apply the tag data to the result ciphertext.

With this illustrative embodiment, it is not necessary to maintain and pass authentication indicators along the circuit to a nullification location. Instead, a global authentication indicator is maintained and is determined only at input points where a new AEAD ciphertext is read and authentication is performed based on the authentication tag. Thereafter, only at the output, prior to returning results to the user, is the global authentication indicator again checked to determine whether the results are valid or not. Thus, during the intermediate HE computations, it is not necessary to have separate authentication indicators. This operation may be relatively the fastest operation of the above example illustrative embodiments, and requires less memory compared to the previous illustrative embodiments, but also offers less flexibility since this embodiment assumes that all computations of the circuit are dependent on all of the input ciphertexts. As a result, some sub-circuits of the circuit may involve computations that may not be dependent upon a ciphertext that was determined to be unauthenticated. Thus, for this sub-circuit, which is not affected by the unauthenticated ciphertext, the computation is valid, yet would be invalidated due to the assumption made by this embodiment in exchange for performance.

For example, assume a circuit C having ciphertexts c1 to c4 and each having a corresponding authentication indicator in1 to in4 determined at the input of the circuit based on the authentication tag using AEAD authentication checks. Assume that the circuit C((c1,in1), (c2,in2), (c3,in3), (c4, in4)) returns (c1+c2, in1 AND in2), (c3+c4, in3 AND in4). If in3-0 in the previous illustrative embodiments in which the authentication indicators are processed by the modified HE computations at the end of the circuit or an intermediate point in the circuit, the resulting ciphertext output would include (c1+c2) while (c3+c4) would be nullified. In contrast, in this last described illustrative embodiment in which the assumption is made to allow for use of a global authentication indicator, nothing would be returned to the user since in3 being 0 indicates that c3 is unauthenticated and due to the assumption made and the use of the global authentication indicator, all results are nullified. The advantage of this illustrative embodiment is that the number of ciphertexts at the end of a circuit is often lower compared to the number of inputs.

These illustrative embodiments are only examples of different ways in which the AT computing tool and AT computing tool operations/functionality can determine locations where to interject into the given circuit a check of authentication tags associated with input ciphertexts to determine authenticity of the ciphertexts, and nullification logic to nullify ciphertexts, and computations dependent upon these ciphertexts, in the circuit. Other embodiments using modified logic from these example illustrative embodiments, but which also determine appropriate locations for insertion of authentication tag checks and nullification logic, may be apparent to those of ordinary sill in the art in view of the present description and are intended to be within the spirit and scope of the present invention.

Thus, the illustrative embodiments provide mechanisms for integrating authentication check capabilities, such as provided by AEAD tools or the like, in transciphering to provide an Authenticated Transciphering (AT) computing tool and computing tool operations/functionality. In some illustrative embodiments, the AT computing tool implements a combination of AEAD encryption and authentication key checks, with the security of input data afforded by HE mechanisms. This provides for an improved computing tool and improved computing tool operations/functionality that specifically addresses the problems of data security in distributed computing systems as previously mentioned above. That is the illustrative embodiments provide a specific computer tool solution that provides authentication of inputs while obfuscating the inputs during computations and providing the ability to nullify the results of such computations based on the authentication of the inputs. Thus, not only are the input ciphertexts authenticated, but the security of the inputs is maintained through HE, such that data leakage due to having to perform computations on decrypted data is avoided.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides an authentication transciphering (AT) computing tool. The improved computing tool implements mechanism and functionality, such as modifying a circuit to insert authentication checks and nullification logic into the circuit to generate a modified circuit, which cannot be practically performed by human beings either outside of, or with the assistance of, a technical environment, such as a mental process or the like. The improved computing tool provides a practical application of the methodology at least in that the improved computing tool is able to provide a hybrid or transciphering encryption/decryption computing tool that leverages the strengths of authentication capable cybersecurity mechanisms, such as AEAD, while achieving the benefits of homomorphic encryption with regard to data leakage.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as authentication transciphering (AT) system 200. In addition to AT system 200, computing environment 100 includes, for example, computer 101, wide area network(WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and AT system 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in AT system 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in AT system 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network(SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network(for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement an AT system 200. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates authentication transciphering which preserves the integrity and anonymous nature of the input ciphertexts when performing computations using homomorphic encryption or any other encryption mechanisms that permit computations to be performed on encrypted ciphertexts.

Figure 2:
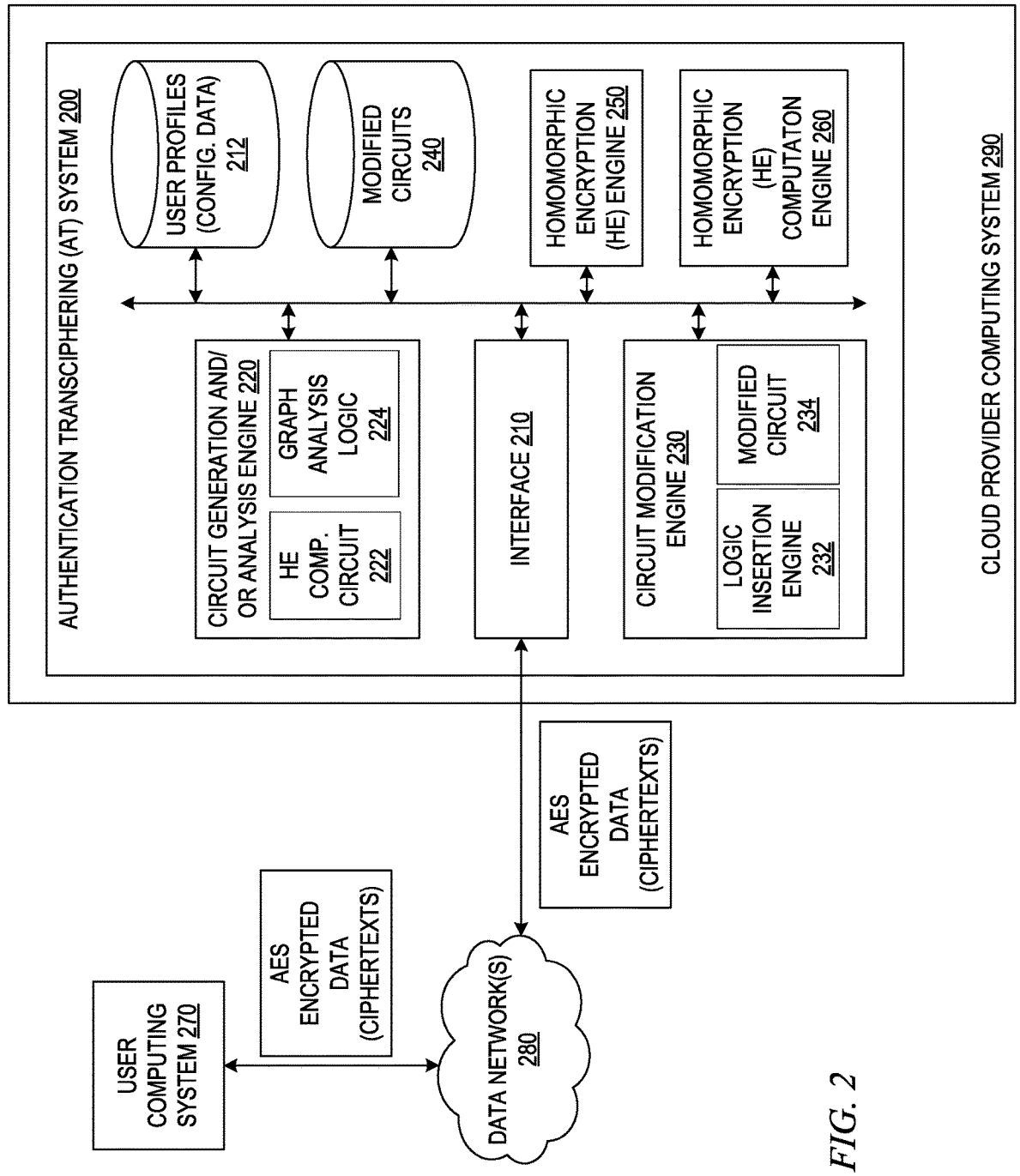
FIG. 2 is an example diagram of the primary operational components of an Authentication Transciphering (AT) computer tool in accordance with one illustrative embodiment.

FIG. 2 is an example diagram of the primary operational components of an Authentication Transciphering (AT) computer tool in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings and the resulting output may aid human beings. The invention is specifically directed to the automatically operating computer components directed to improving the way that data is secured using cryptographic processes, where the improvement provides mechanisms that provide the security of authentication checks for the ciphertexts, while providing the obfuscation of the input data when performing computations, such as may be made possible by homomorphic encryption. As such, the mechanisms and operations performed by the illustrative embodiments cannot be practically performed by human beings as a mental process and are not directed to organizing any human activity.

As shown in FIG. 2, an authentication transciphering (AT) system 200 is provided as either a separate service for one or more cloud computing systems 290 or integrated into the cloud computing systems 290. In the depicted example, the AT system 200 is integrated into the cloud computing system 290. In other illustrative embodiments, the AT system 200 may operate to generate modified circuits for HE computations and provide the modified circuits to the cloud provider system 290 which implements HE mechanisms and may utilize the modified circuit to perform Authentication Transciphering from a AEAD encrypted message to an HE encrypted message, perform HE computations in accordance with the mechanisms of the illustrative embodiments, and provide AEAD encrypted results back to the submitter of the AEAD encrypted data. In such a case, the cloud provider system 290 is configured to utilize the authentication indicators and corresponding modified HE computations previously discussed above in accordance with one or more of the previously described embodiments. In other embodiments, where the AT system 200 is integrated with the cloud computing system 290, for example, the AT system 200 may operate to perform the HE computations of the illustrative embodiments in accordance with the modified circuit as generated by the AT system 200.

As shown in FIG. 2, the AT system 200 includes an input interface 210 through which user data may be received, such as from user computing system 270, and results of the operation of the AT system 200 may be returned or sent to appropriate computing systems via the one or more wired/wireless data networks 280. It should be appreciated that the "user" and "user system" 270 in this depiction is not limited to an individual person and individual computing system, but rather may represent an organization or group, or even an automated computing system that submits data to the AT system 200 for processing. For ease of explanation, the depiction shows a single user and user computing system 270, but this is not intended to be limiting on the present invention.

The user computing system 270 may submit data to the AT system 200 via the network(s) 280 both as part of a preliminary configuration operation and/or as a runtime processing of the submitted data via an established circuit for HE computations. In a preliminary configuration operation, the user of a user computing system 270, provides configuration information for use with workloads of data that are to be processed in runtime operation. This preliminary configuration operation may occur such as when the user first registers with the AT system 200 or cloud computing system 290, whenever a circuit is to be modified, or at any other time when the user requests that a new configuration of a circuit for processing workloads is to be implemented by the AT system 200 and/or cloud provider system 290.

As part of this preliminary configuration operation, the user of the user system 270 specifies, as inputs, the types of workloads that are to be processed, a circuit of HE computations that are to be performed on these subsequent workloads, and configuration parameters 212 specifying priorities of performance and/or security criteria when selecting a location for insertion of nullifying logic into the specified circuit. The configuration parameters 212 may be stored in a user profile storage for later retrieval and use in generating modified circuits for workload processing. The specification of the circuit may be the description of a result that the user wishes to obtain when the workload is processed or may be a specific step-by-step process of HE computations that are to be performed on the workloads. In the case that the specification is a description of the result, e.g., process my workloads and return X, the HE mechanisms of the AT system 200 or cloud provider system 290 may generate the circuit from the description of the results of the workload. For example, given the type of workload that is to be processed, and given the result that is to be generated, the system 200/290 may generate a circuit of intermediate HE computations that can take the specified type of workload input and generate the requested result. Alternatively, the user can specify the particular circuit including the intermediate HE computations that are to be performed to achieve the desired results given the type of workload.

During the preliminary configuration operation, based on the inputs from the user, the AT system 200 analyzes the circuit, inserts authentication logic at the inputs of the circuit, and determines an appropriately selected location for insertion of nullification logic. The circuit generation and/or analysis engine 220 operates to generate a circuit of HE computations based on a user specification of the circuit and/or a specification of the HE operation that is to be performed on workloads, as well as operates to evaluate the circuit in accordance with one or more of the illustrative embodiments, to determine a location for the nullification logic that provides the most efficient location for nullification taking into consideration the configuration parameters 212 specifying the prioritization of performance and security factors. This analysis may involve representing the circuit 222 as a graph representation, using the graph analysis logic 224, in which edges are HE computations and nodes are ciphertexts, e.g., input ciphertexts, intermediate ciphertexts generated as a result of HE computations, or output ciphertexts that are the result of the circuit. The generated graph representation may then be analyzed by the graph analysis logic 224 to identify locations for appropriate placement of authentication check and nullification logic in the circuit 222 to generate a modified circuit which may be stored and/or used for processing workloads from the user computing system 270. This analysis may involve implementing a minimal cut algorithm to identify locations as candidate locations for insertion of the nullification logic.

In some illustrative embodiments, if the number of inputs to the circuit are determined to be lower than a threshold number of inputs, then the nullification logic may be inserted at the input nodes of the graph. If the number of inputs is equal to or greater than the threshold, and a number of outputs of the circuit is less than a predetermined threshold number of outputs, then the nullification logic may be inserted at a location just prior to output nodes of the graph where the HE computation results are output, e.g., at nodes one level higher in the graph than the output nodes such that the ciphertexts can be nullified before output.

In response to the number of inputs being equal to or greater than the threshold, and the number of outputs being equal to or greater than the predetermined threshold, then a further analysis is performed using a minimal cut algorithm to identify one or more candidate locations for insertion of the nullification logic, and then select a location for the nullification logic based on an evaluation of these candidates. For example, in some embodiments, a straight minimal cut analysis is performed that identifies the number of ciphertexts at each location that would be nullified and selecting a location where it is determined that there is a least number of ciphertexts that need to be nullified. In other embodiments, a cost function is employed that weights locations according to user specified configuration parameters indicating the priority of performance/security factors in finding locations for insertion of nullification logic. In some cases, if the user has not specified configuration parameters, default configuration parameters may be utilized.

Based on the circuit analysis performed by the circuit analysis engine 220, a selected location for the nullification logic is provided to the circuit modification engine 230 which modifies the circuit to include the inserted nullification logic. The nullification logic itself comprises logic that checks that state of one or more authentication indicators associated with ciphertext, or a global authentication indicator, depending on the embodiment, to determine whether to nullify ciphertexts and their corresponding circuit/sub-circuit of HE computations that are dependent upon the nullified ciphertexts. As discussed previously, in some illustrative embodiments, the authentication tags associated with AEAD encrypted ciphertexts are checked to determine the integrity of the input ciphertexts, and the authentication indicator is generated with a value indicating whether the corresponding cyphertext is authentic or not. This authentication indicator is a ciphertext encrypted by HE and is passed along with the HE ciphertexts through the circuit and is processed in accordance with HE computations of the illustrative embodiments that are augmented to handle the authentication indicators. In some illustrative embodiments, a global authentication indicator may be maintained to avoid having to pass authentication indicators along the circuit. The nullification logic may differ depending on the location selected, but in general will implement one or more of the nullification functions described hereafter with regard to FIGS. 3-7, and previously mentioned above.

The circuit modification engine 230 may employ the logic insertion engine 232 to perform the insertion into the circuit 222 of the authentication tag checking logic at the inputs of the circuit 222, as well as the nullification logic at the determined appropriate location. Thus, the modified circuit 234 implements both the AEAD or AES based authentication tag checking, as well as the ability to perform HE computations while providing for nullification of ciphertexts at an appropriate selected location in the circuit.

Based on the generation of the modified circuit by the circuit modification engine 230, the modified circuit is stored in a modified circuit repository 240 for use in processing workloads from the user computing system 270. When subsequent workloads are submitted, the corresponding modified circuit is retrieved from the repository 240 and implemented by the HE engine 250 and HE computation engine 260. That is, the HE engine 250 performs operations to encrypt the received workload data using HE mechanisms, and the HE computation engine 260 performs the HE computations of the modified circuit retrieved from the repository 240, which may include the processing of the authentication indicators. The HE computation engine 260 may further implement the nullification logic inserted into the modified circuit retrieved from the repository 240 and nullify ciphertexts and the circuit/sub-circuit dependent upon the nullified ciphertexts. The generated results, which may include the nullified results, may then be returned to the user computing system 270.

Thus, the illustrative embodiments provide an improved AT computing tool 200 and computing tool operations/functionality. The AT computing tool 200 of the illustrative embodiments receives several ciphertexts with their associated nonces, additional data, and tags, e.g., AEAD encrypted ciphertexts (AES encrypted data) with their associated nonces, additional data, and tags, where the tags are authentication tags used to authenticate the contents of the ciphertexts, e.g., the original messages or data encrypted into the ciphertexts, so as to ensure the integrity of these input ciphertexts. The tags serve as authentication mechanisms by performing an operation at the input of the circuit to authenticate the ciphertext based on the tag and then nullify the ciphertext, either immediately or at a later point in the circuit, should the tag and the ciphertext not match, i.e., the tag is a "bad" tag.

The AT computing tool 200, in an offline phase, analyzes the circuit, based on the configuration parameters, and determines appropriate locations to apply the authentication of the tags and the location of where to perform a responsive action, if necessary, based on the results of the authentication, i.e., nullifying the ciphertexts and the circuit or sub-circuit that depends on the nullified ciphertexts. This offline phase may be performed when a new circuit is being deployed for use, for example, where the circuit specifies the various sequences and branches of HE computations going from HE encrypted input(s) to HE encrypted output(s), with optionally one or more intermediate ciphertexts being generated and processed due to the HE computations.

The determination of the appropriately selected locations to apply authentication of the tags and performing the responsive action, e.g., nullification of ciphertexts, depends on the particular embodiment of the invention employed, but is performed by the circuit analysis engine 220 and implemented by the circuit modification engine 230. In general the checking of the authentication tags to determine integrity of the input ciphertexts will generally be performed at or substantially near the input nodes of the circuit as these authentication tags are tied to the input ciphertexts. The responsive action for ciphertexts that are determined to be dependent upon an unauthenticated input ciphertext, may be performed at a different location in the circuit however.

The offline phase determines this optimal location and inserts the nullification logic into the circuit at the determined location such that a modified circuit is generated and stored in the modified circuits repository 240 in association with the user. In this way, when subsequent workloads from that user are received during an online phase of operation, the modified circuit may be used to process the subsequent workloads using HE and HE computations in accordance with the illustrative embodiments. During the online phase, the AT computing tool 200 uses the modified circuit to achieve AT operations which combine the encryption authentication mechanism, such as AEAD, with the Homomorphic Encryption (HE) based computations. That is, the user computing system 270 submits AEAD (or AES encrypted) workloads for processing by the cloud provider system 290 or AT system 200, and the HE engine 250 encrypts the AEAD encrypted workloads with HE encryption and performs HE operations on these HE encrypted ciphertexts.

The AT system 200 applies the knowledge gained through the offline phase of operation, which identifies the appropriately selected locations in the circuit to apply authentication of the tags and perform a responsive operation with regard to "bad" tags, or tags that cannot be properly matched for authentication purposes, where the application may take various forms depending on the desired implementation. For example, in some illustrative embodiments, in response to reading the AEAD ciphertexts at the input of the circuit, and their associated authentication tags, the illustrative embodiments check whether the authentication tags are valid, i.e., indicate that the corresponding ciphertext/content of the ciphertext has not been tampered with, and if not, the associated HE ciphertext data is nullified, e.g., deleted, modified, or the like. This may occur, for example, at the beginning of the circuit or at a location near the beginning of the circuit, with the subsequent entire branches of the circuit, which depend on the unauthenticated ciphertexts, being invalidated. This achieves a higher security as the potentially problematic ciphertexts are nullified early in the HE computations and avoid situations where an attacker may have access to a memory storing such tampered with ciphertexts, but may be less efficient as the nullification at this stage may introduce additional latency or overhead in the performance of the HE computations.

In some illustrative embodiments, in response to reading the AEAD ciphertexts and associated authentication tags, an encrypted authentication indicator is generated for each AEAD ciphertext indicating whether its associated authentication tag is valid or not, i.e., whether or not the associated authentication tag is a "bad" tag or not. This encrypted indicator is bound with the corresponding HE ciphertext that is generated from the AEAD ciphertext. Whenever an HE computation (e.g., ADD/MUL/Rot) is performed as part of the circuit of HE computations, the HE encrypted authentication indicator is included as part of the computations such that the "bad" tag indicator or good tag indicator can be passed to the point in the circuit where nullification of the ciphertext, circuit, or sub-circuit can be performed based on the state of the authentication indicator.

With the mechanisms of the illustrative embodiments, HE computations may be augmented to be able to handle the authentication indicators in a manner that if an authentication indicator specifies that the corresponding ciphertext is based on an unauthenticated input ciphertext, e.g., an AEAD input ciphertext whose authentication tag was not able to be verified and thus, the AEAD input ciphertext integrity may be compromised, then the resulting authentication indicator for the intermediate ciphertext or output ciphertext also indicates this dependency on an unauthenticated ciphertext, e.g., by ANDing the authentication indicators using a multiplication computation. As noted above, example HE computations that are augmented by the mechanism of the illustrative embodiments to handle HE encrypted authentication indicators may be of the following types:

For an ADD computation: (c3, in3)=Add((c1, in1), (c2, in2)) compute c3=HE.ADD(c1, c2) and in3=in1*in2 i.e., (in1 AND in2).

For a MUL computation: (c3, in3)=Mul((c1, in1), (c2, in2)) compute c3=HE.MUL(c1, c2) and in3=in1*in2 i.e., (in1 AND in2).

For a Rot computation: (c3, in3)=Rot((c1, in1)) compute c3=HE.Rot(c1) and in3=HE.Rot(in1)

where again c1, c2, c3 are ciphertexts, in1, in2, in3 are authentication indicators whose values are set based on whether an authentication tag matches the input ciphertext/message, and are associated with the corresponding ciphertexts c1, c2, and c3, respectively, and HE.ADD, HE.MUL, and HE.Rot are homomorphic encryption addition, multiply, and rotation operations that are modified to handle the authentication indicators as parameters. It should be appreciated that these HE computations may be the computations of the circuit that are performed as part of the various edges in the graph representation of the circuit and result in the intermediate or output HE ciphertexts of the circuit, i.e., the nodes of the graph.

Again, with the ADD computation, it can be seen that the two ciphertexts c1 and c2 are ANDed to generate ciphertext c3 using the HE.ADD computation, and the illustrative embodiments add the ability to handle the authentication indicators in1 and in2 accompanying the ciphertexts c1 and c2 to generate an authentication indicator in3 of the ciphertext c3, where the authentication indicator i3 is the product of the indicators in1 and in2 of the input ciphertexts c1 and c2. Thus, if either of in1 or in2 is a "0", indicating that there was a mismatch between the authentication tag and the ciphertext or message of the input ciphertext, then the resulting indicator in3 will be "0", which indicates that somewhere in the circuit, the input could not be authenticated and thus, the circuit/sub-circuit dependent upon these ciphertexts needs to be nullified, i.e., the results of the computation not relied upon due to the potential tampering with the inputs. Similarly, with the MUL computation, it can be seen that the two ciphertexts c1 and c2 are multiplied to generate ciphertext c3 using the HE.MUL computation, and the illustrative embodiments add the ability to handle the authentication indicators in1 and in2 accompanying the ciphertexts c1 and c2 to generate an authentication indicator in3 of the ciphertext c3, where again the authentication indicator i3 is the product of the indicators in1 and in2 of the input ciphertexts c1 and c2. With the Rot computation, the handling of the ciphertext and authentication indicator is different from that of the other two examples in that there is only one ciphertext input and one corresponding authentication indicator. In the case of the Rot computation, the HE.Rot computation is applied to both the input ciphertext c1 and the authentication indicator in1 separately to thereby generate the corresponding output ciphertext c3 and associated authentication indicator in3.

These authentication indicator augmented HE computations may be performed during runtime operations when processing workloads through a circuit. The circuit comprises one or more of the HE computations to take HE encrypted inputs and generate an HE encrypted output. In some illustrative embodiments, when performing these HE computations, as part of the circuit, authentication tag checks are performed at the inputs on the AEAD or AES encrypted input ciphertexts, and nullification operations are performed either at the input, just prior to the output, or at some intermediate location within the circuit as determined from the offline phase of operation and as integrated into the modified circuit. During runtime operation, the HE computation engine 260 runs the circuit on the workload performing the corresponding authentication check, HE computations, and nullification logic as specified in the modified circuit, with HE encrypted ciphertext results being returned to the AT system 200 or cloud provider system 290 for use in responding to the user computing system 270, e.g., generating an AEAD or AES encrypted response that is sent back to the user computing system 270.

With regard to the offline operation to identify locations for authentication tag checks and nullification logic insertion in a specified circuit, as noted above, this determination of appropriate selected locations may take various forms depending on the specific illustrative embodiment selected. FIGS. 3-7 illustrate five different solutions for insertion of authentication tag checks and nullification logic into a given circuit of HE computations. In the examples shown in FIGS. 3-7, each node in the graph represents a ciphertext with the arrows between nodes representing HE computations performed on the ciphertexts, and in some cases the authentication indicators accompanying the ciphertexts.

Figure 3:
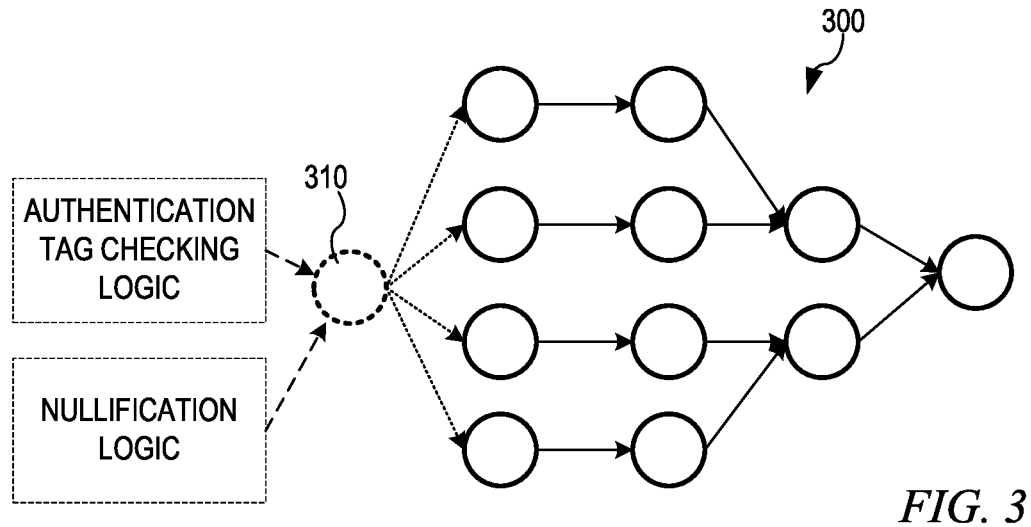
FIG. 3 is an example diagram showing a first solution for performing authentication and sub-circuit based ciphertext invalidation in accordance with one illustrative embodiment.

FIG. 3 is an example diagram showing a first solution for performing authentication and sub-circuit based ciphertext invalidation in accordance with one illustrative embodiment. As shown in FIG. 3, this first solution involves performing the authentication tag check and nullification operations substantially immediately upon reading the AEAD input ciphertexts and determining that the authentication tag associated with the AEAD input ciphertext cannot be matched, i.e., there is some change in the AEAD input ciphertext that causes a mismatch and thus, a potential integrity issue. As noted previously, for security purposes, it is preferred to nullify ciphertexts as early as possible in the circuit, as the longer the non-nullified ciphertext is kept in memory, the more time an attacker has to acquire a copy of it. This solution of nullifying at the input node(s) is useful when there are a relatively small number of input ciphertexts, e.g., when the number of input nodes is less than a predetermined threshold number of input nodes. For example, if there are 1000 input nodes then 1000 multiplications would need to be performed, which adds a significant cost in terms of latency and may also add error to ciphertexts when using approximated HE. Now consider again the previous example from above, where after the computation there is only one ciphertext, and thus only one multiplication. If the input is large and the output is small, e.g., the input is an X-ray image and the output is a bit stating whether the X-ray image indicates pneumonia or not, it is more efficient to nullify at the output.

Thus, in the depicted example, at input node 310, the authentication tag of the AEAD input ciphertext is checked prior to applying HE encryption on the AEAD input ciphertext, and a determination is made as to whether there is a match or mismatch. If there is a mismatch, then the AEAD ciphertext is nullified prior to being processed through the circuit 300. The entire circuit 300 is performed because the tag comparison results are encrypted and it is not known whether or not the computation should be discarded. That is, whether or not the ciphertext is able to be authenticated or not, the output of the HE circuit 300 is the same, i.e., ciphertexts and an encrypted indicator. Once the ciphertext is nullified, the circuit 300 treats this input node as an encrypted 0 and all the following computations are nullified accordingly.

If there is a match, then the input ciphertext is not nullified and is then encrypted using HE with subsequent HE computations being performed on the HE ciphertext. In this example, if there are multiple input nodes, this process would be performed for each input node. Thus, if any one input ciphertext is determined to be unauthenticated, then the result generated by the circuit will be invalid. In general, after nullifying a ciphertext it is no longer needed to store the indicator, as it was already used. If there are multiple inputs and only some were nullified then there will be a corrupted output that is not dependent on unauthenticated data because the latter was deleted. In such a case, the user may be alerted that the circuit output is corrupted. This may be done by propagating the indicator and delivering the indicators to the user or by using a global indicator.

Figure 4:
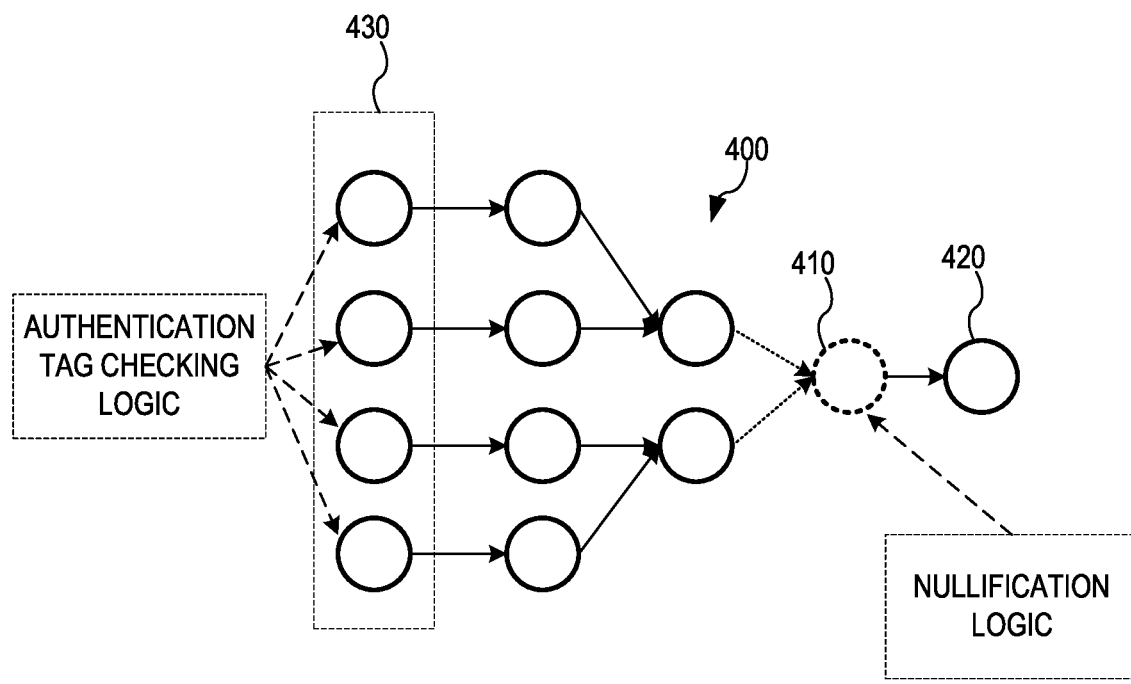
FIG. 4 is an example diagram showing a second solution for performing authentication and sub-circuit based ciphertext invalidation in accordance with one illustrative embodiment.

FIG. 4 is an example diagram showing a second solution for performing authentication and sub-circuit based ciphertext invalidation in accordance with one illustrative embodiment. This second solution is applicable to situations where there are equal to or more than the predetermined number of input nodes mentioned in the example of FIG. 3. For example, if the predetermined number of input nodes is 2, then the solution of FIG. 3 may be applied when the number of input nodes is one. However, if there are 2 or more input nodes, then the solution shown in FIG. 4 may be employed, as long as the number of output nodes is less than a second threshold number of nodes. In each instance, it is best for security purposes to perform nullification as close to the input nodes as possible. However, for performance reasons, it is best to perform nullification where the number of ciphertexts that need to be nullified is minimized. Thus, as shown in FIG. 4, the nullification in the depicted graph would be best at node 410 since it requires the least number of ciphertext nullification operations in order to nullify the output that is provided at node 420.

In the solution depicted in FIG. 4, the authentication tag check is still performed at the input nodes 430, since the authentication tags are tied to the AEAD (AES) ciphertexts, prior to encryption using HE mechanisms. However, these authentication tags are not passed with the HE ciphertexts through the circuit. Instead, the results of the authentication tag checks are used to set a value in an authentication indicator which is encrypted using HE and tied to the HE encrypted ciphertexts of the inputs. If the authentication tag check results in the corresponding AEAD ciphertext being found to be valid, then the authentication indicator may be set to a first value, e.g., 1, and if the AEAD ciphertext is found to be invalid, then the authentication indicator may be set to a second value, e.g., 0. These authentication indicator values are encrypted using HE so that they may be passed along with the HE encrypted input ciphertexts to the various HE computations of the circuit and meet with HE requirements that the HE computations not have access to the underlying decrypted data.

The HE encrypted authentication indicators allow for deferring the nullification logic operations to a later point or location in the circuit when it is determined to be more efficient to perform the nullification. The HE encrypted authentication indicators allow for a later determination of whether or not the corresponding ciphertext needs to be nullified. The HE encrypted authentication indicators of ciphertexts are operated on by the HE computations as discussed above so as to AND the ciphertexts which provides that if any upstream ciphertext has an authentication indicator that indicates that the ciphertext is based on an input ciphertext that could not be authenticated, then the ciphertext is invalid and it, and/or any other ciphertexts that depend on it, should be nullified at some point in the circuit. It should be appreciated that this nullification operation may involve a number of multiplication operations or other operations to essentially set the ciphertext values to a null or invalid state such that they cannot be relied upon for further operations. As this nullification operation creates latency in the performance of the HE computations, it is best to locate this nullification logic and corresponding nullification operations at a location in the circuit where the number of nullification operations that need to be performed is minimized.

In the depicted example, this nullification occurs at a layer of the graph of the circuit that is just prior to the output node 420 of the graph. Because the number of outputs is less than the second threshold, it is determined that locating the nullification logic at this layer provides for a minimization of nullification operations and thus, a minimum additional latency. Thus, in this solution, the nullification logic is inserted at the layer of nodes 410 just prior to the output nodes 420 so as to perform nullification of the ciphertexts before the ciphertexts are output as a result of the HE computation.

FIG. 5 is an example diagram showing a third solution for performing authentication and sub-circuit based ciphertext invalidation in accordance with one illustrative embodiment. While the solutions shown in FIGS. 3 and 4 are good solutions for situations where the inputs or the outputs are relatively small in number, as specified by the first and second thresholds, not all circuits provide such conditions. In addition, there are additional performance and security considerations that may need to be taken into consideration when determining where to locate the nullification logic in a given HE circuit.

In the third solution, a minimal cut algorithm may be executed on the graph of the circuit to identify one or more locations within the graph where a cut crosses a minimal number of edges of the graph, i.e., the number of nullification operations needed to nullify the ciphertexts is minimized should a ciphertext be dependent upon an unauthenticated input ciphertext. This may result in a single cut being identified that has a minimized number of edges that are cut, or may have multiple cuts with the same minimized number of edges. For example, in the graph shown in FIG. 5, the minimal cut algorithm traverses the graph and determines a location where applying the authentication indicator based nullification logic would result in a minimizing of the metrics used for determining a location for the nullification logic, e.g., latency, memory, or the like, and contributes the most to the security of the circuit. In some illustrative embodiments, this involves traversing the graph to determine the number of edges that are inputs to each node and determine a location where, if the graph were cut at the inputs to the node, the number of edges cut would be minimized. In this example, the minimal cut location would be at node 510 as there is only a single edge cut.

In the case that there are multiple candidate locations for such a minimum cut, e.g., more than one location would entail only a single cut in the example shown in FIG. 5, additional configuration parameters may be used to select between these candidate locations, such as security (selecting a cut closer to a beginning of the circuit), latency (selecting a cut closer to the end of the circuit), or the like. Thus, a minimum cut algorithm may be used to identify where the nullification logic should be inserted into the graph of the circuit and the circuit may then be modified accordingly to implement the authentication tag check at the inputs and the nullification logic at the identified intermediate location within the circuit.

FIG. 6 is an example diagram showing a fourth solution for performing authentication and sub-circuit based ciphertext invalidation in accordance with one illustrative embodiment. As mentioned previously, in some illustrative embodiments, the authentication indicator generated as a result of the authentication tag check of the input ciphertexts is passed as part of the HE computations, with the authentication indicators for the input ciphertexts to an HE computation being combined, e.g., ANDed through a multiplication operation, to generate an authentication indicator for the output of the HE computation. The above illustrative embodiments pass these authentication indicators with each ciphertext as HE computations are performed in accordance with the circuit. However, in other illustrative embodiments, such as shown in FIG. 6, a global authentication indicator may be maintained.

As shown in FIG. 6, in these illustrative embodiments, when generating the authentication indicators in response to reading the AEAD ciphertexts and associated authentication tags at the inputs 610-640, a global encrypted indicator 650 for all of the input AEAD ciphertexts 610-640 is generated by ANDing all the authentication indicators 610-640 together and storing the combined global authentication indicator 650 in a global storage location 680. Whenever a new AEAD ciphertext 670 is read, its corresponding authentication indicator, e.g., in5 in the figure, may be ANDed to the combined global authentication indicator 650 which is stored in the global storage location 680. Prior to sending specific ciphertext results to the user, the combined global authentication indicator 650 stored in the global storage location 680 may be checked by inserted nullification logic, such as may be inserted at node 690 to determine if the resulting output ciphertext is valid or not, i.e., is or is not based on an input ciphertext that could not be authenticated. In this way, if the combined global authentication indicator 650 indicates that any one ciphertext was found to be unauthenticated, the resulting output ciphertext can be nullified before sending it to the user.

With this illustrative embodiment, it is not necessary to maintain and pass authentication indicators along the circuit to a nullification location. Instead, a global authentication indicator 650 is maintained and is determined only at input points 610-650 and 670 where a new AEAD ciphertext is read and authentication is performed based on the authentication tag. Thereafter, only at the output 690, prior to returning results to the user, is the global authentication indicator 650 again checked to determine whether the results are valid or not. Thus, during the intermediate HE computations, it is not necessary to have separate authentication indicators. This operation may be relatively the fastest operation of the above example illustrative embodiments, and requires less memory compared to the previous illustrative embodiments, but also offers less flexibility since this embodiment assumes that all computations of the circuit are dependent on all of the input ciphertexts. As a result, some sub-circuits of the circuit may involve computations that may not be dependent upon a ciphertext that was determined to be unauthenticated. Thus, for this sub-circuit, which is not affected by the unauthenticated ciphertext, the computation is valid, yet would be invalidated due to the assumption made by this embodiment in exchange for performance, as previously discussed above.

FIGS. 7A-7D illustrate an example diagram showing a fifth solution for performing authentication and sub-circuit based ciphertext invalidation in accordance with one illustrative embodiment. In some illustrative embodiments, similar to the previous example embodiment of FIG. 5, the AT computing tool may generate authentication indicators for inputs and defer nullification to a later point in the circuit. This later point in the circuit may be at the end of the circuit, such as depicted in FIG. 4, i.e., at an output stage of the circuit which looks to the authentication indicator for each output ciphertext and determines whether it needs to be nullified or not. In some illustrative embodiments, this later point may be an intermediate point along the circuit where nullification is determined to be the most efficient. One example of this is shown in FIG. 5 where the evaluation is based on the number of nullification operations that would need to be performed.

However, in other illustrative embodiments, the determination of the optimal location for the nullification logic may be more complex and may need to take into consideration many different performance and security factors when determining where to locate the nullification logic. With such a complex evaluation, the resulting optimal location may not always coincide with the minimal number of cuts, as in the example discussed above with regard to FIG. 5. To the contrary, in other illustrative embodiments, a cost function based analysis may be performed to evaluate various candidate locations with regard to a plurality of configuration parameters directed to performance and/or security factors, to thereby find the least cost candidate and select it as the location for the nullification logic.

For example, as noted previously, nullification closer to the beginning of the circuit provides greater security as the potentially tampered with ciphertext is not maintained in memory as long and other operations will not be performed on potentially tampered with ciphertexts. However, nullification is a costly process often involving multiple multiplication operations and with larger sized ciphertexts at the beginning of the circuit, this nullification is more costly in terms of computation resources and latency nearer the beginning of the circuit. On the other hand, while nullification at the output of the circuit would entail smaller ciphertexts and thus, less costly nullification operations, security is much lower as the potentially tampered with ciphertexts must remain in memory longer and may potentially affect other computations and operations. At an intermediate point, there is a tradeoff between these considerations of security and computation latency, as well as other potential performance and security factors, such as memory utilization and the like.

FIGS. 7A-7D illustrate an example illustrative embodiment in which the AT computing tool computes, for each cut of the circuit, the number of operations required if the authentication indicator were checked and nullification of ciphertexts would be applied. The AT computing tool then chooses the location in the circuit corresponding to the cuts that minimize costs, such as security, latency or memory usage costs. A cost function may be defined that weights these various costs, or tradeoff factors, when evaluating possible locations within the circuit where the nullification logic may be inserted to perform efficient nullification of computations dependent upon unauthenticated ciphertexts.

Figure 7A:
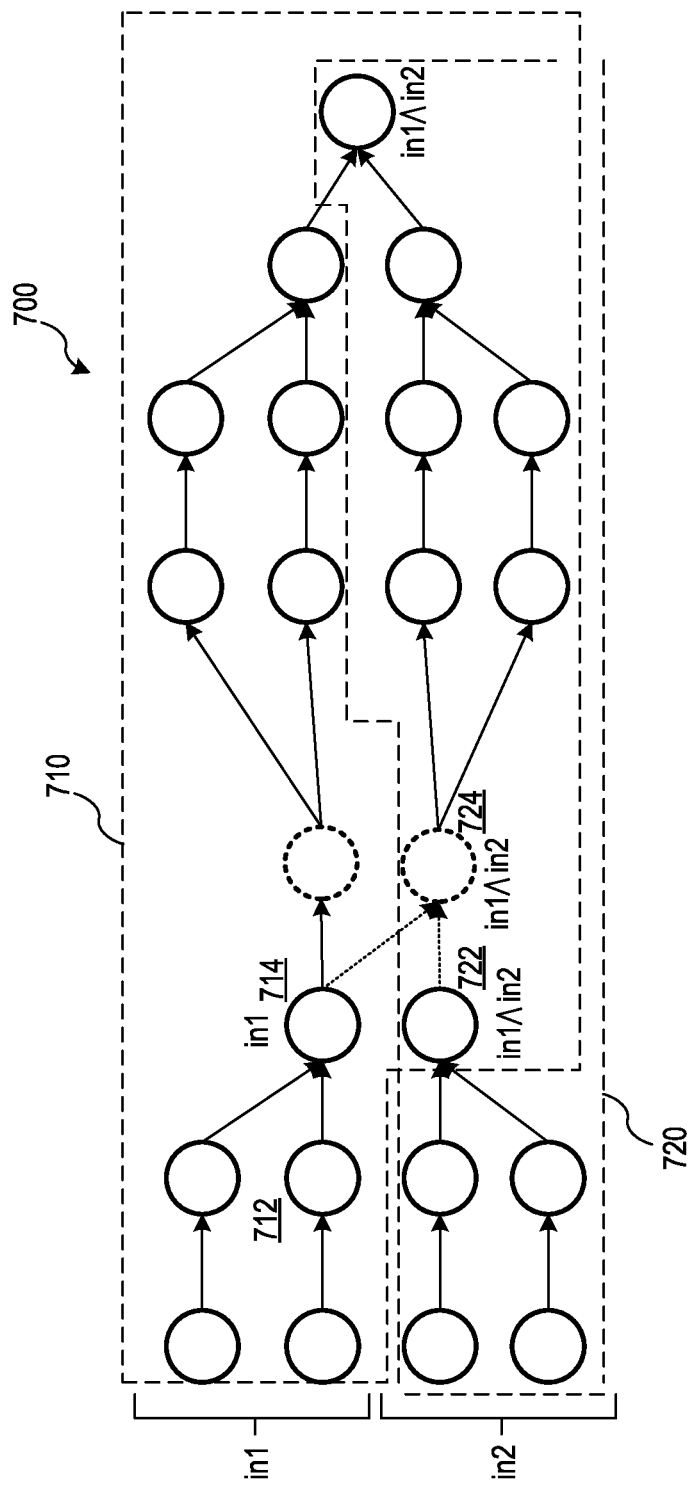
FIGS. 7A-7D illustrate an example diagram showing a fifth solution for performing authentication and sub-circuit based ciphertext invalidation in accordance with one illustrative embodiment.

FIG. 7A shows an example of a circuit in which such a cost function based evaluation of locations for insertion of nullification logic may be utilized in accordance with one illustrative embodiment. In this illustrative embodiment, similar to the illustrative embodiment of FIG. 5, the AT computing tool may apply a minimal cut algorithm that chooses a minimal cut in which applying the nullification operation to ciphertexts that are unauthenticated or depend on an upstream unauthenticated ciphertext, minimizes the costs, such as security costs, latency costs, or memory costs. The difference between the embodiment corresponding to FIG. 5 and that of FIGS. 7A-7D is that the embodiment of FIGS. 7A-7D utilizes a cost function having weights corresponding to configuration parameters, where the cost function is computed from the number of cuts as well as these weighted configuration parameters. That is, there may be a configuration parameter for security, a configuration parameter for latency, and a configuration parameter for memory utilization. A user may input configuration parameters that sets priorities for these parameters and these priorities may be used to specify weights for these various parameters.

Figure 7B:
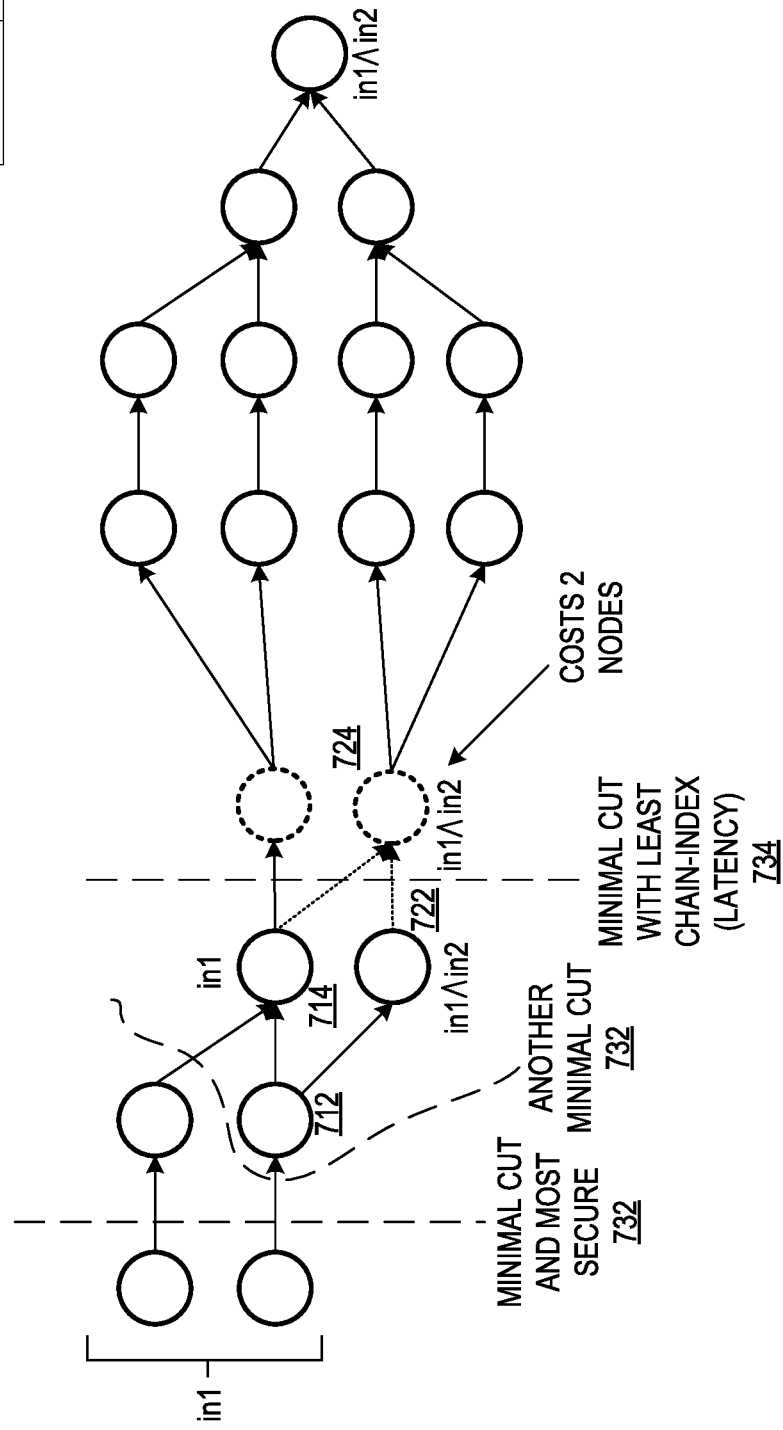
Figure 7C:
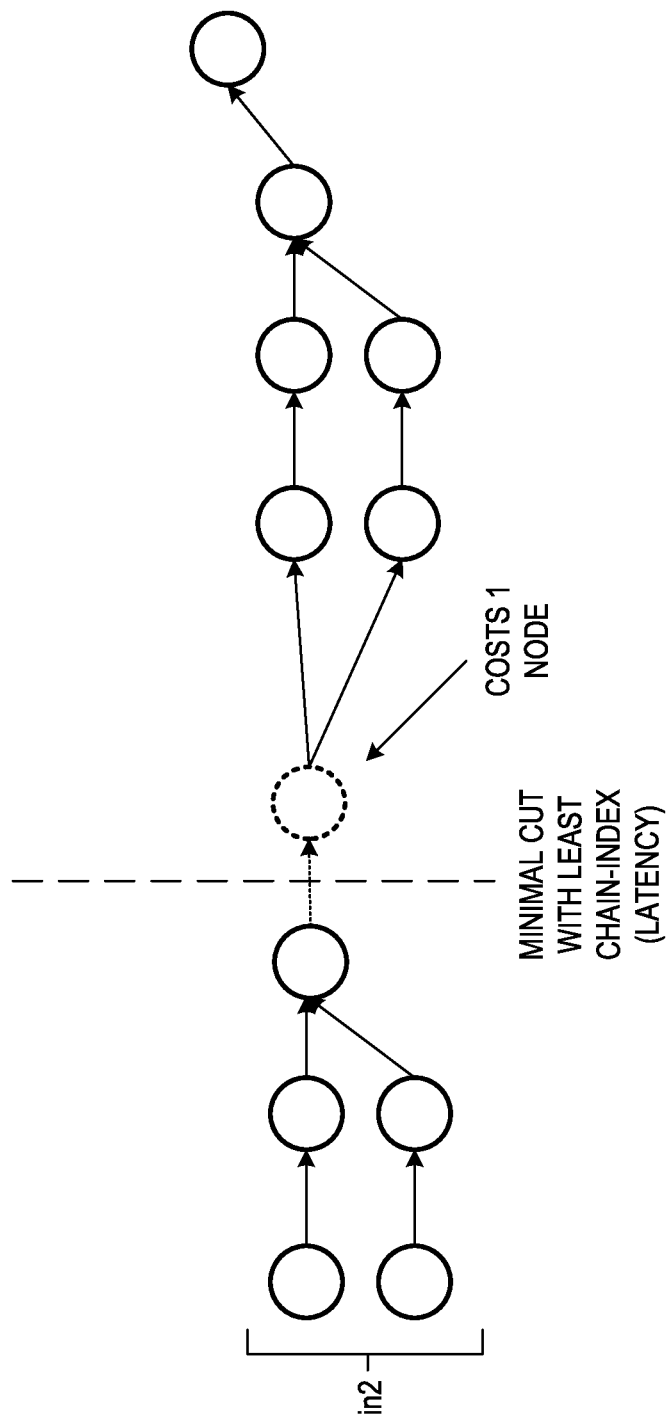
Figure 7D:
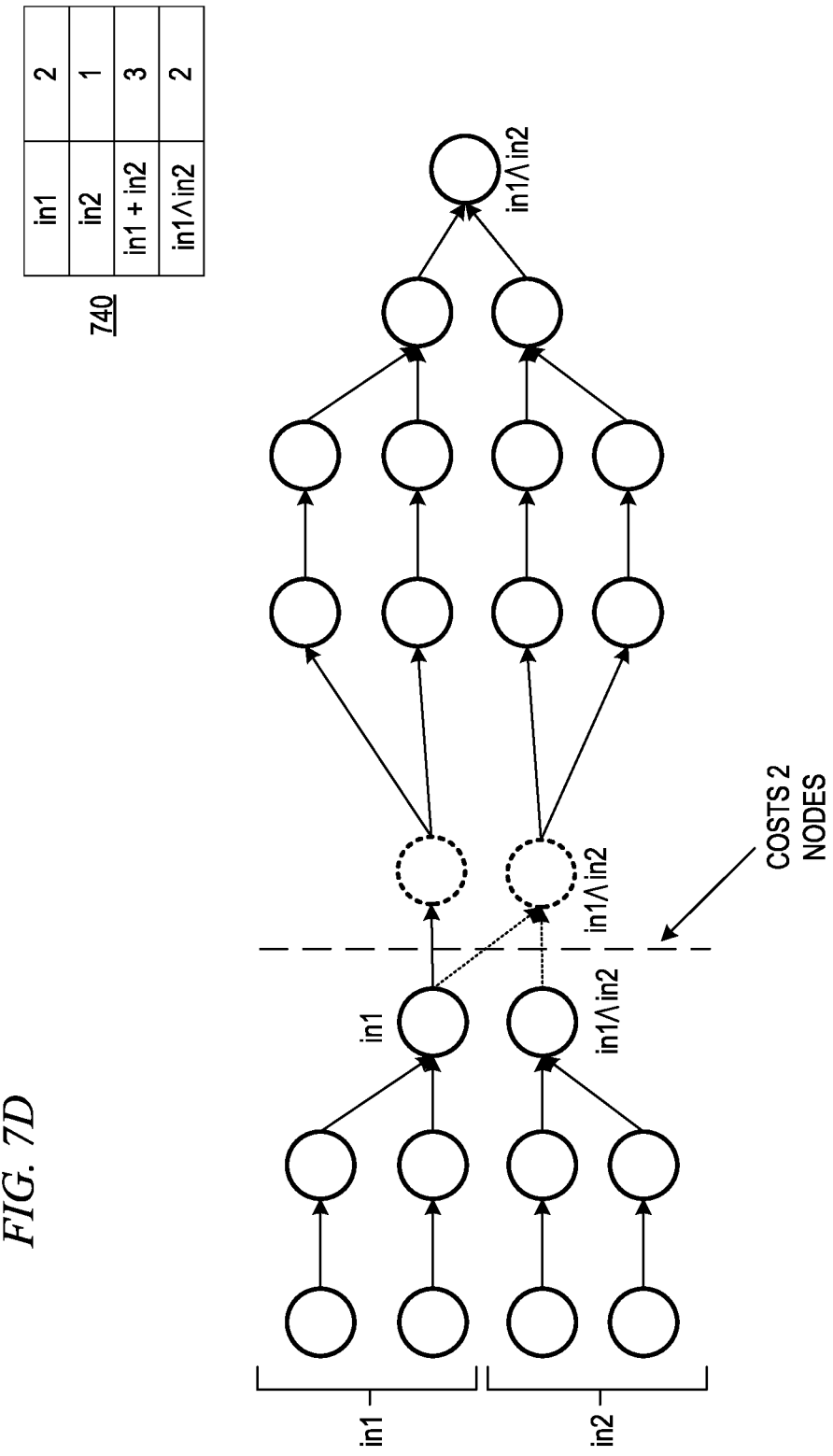

Consider for example, the example described hereafter with regard to FIGS. 7B-7D where there are two tags and thus two indicators in1, in2. It is needed to nullify the data based on either each one of them separately (FIGS. 7B-7C) or together (FIG. 7D). In FIG. 7B one need only consider the minimal cut for nodes that are affected by inputs authenticated by tag 1. In FIG. 7C one need only consider nodes that are affected by inputs from tag 2. As both tags information need to be applied, in FIG. 7C the above data is combined, i.e., include nodes from two different cuts. In contrast, in FIG. 7D a cut is found that corresponds to both in1 and in2, i.e., it is affected by both tags at once, and thus one only needs to consider this single cut. FIG. 7D is better than FIG. 7C not because it considers less cuts, but because the total nodes that were affected are 2 instead of 3.

Each location in the circuit that has a number of cuts less than a predetermined threshold number of cuts, or which are in the "top K" cuts, i.e., K locations having the least number of nodes per cut, may be evaluated using the cost function configured with the weights of the configuration parameters. The values of the configuration parameters may be set based on the depth of the cut line in the graph of the circuit, e.g., cut lines closer to the inputs of the circuit will have a security value that is higher than cut lines closer to the outputs, cut lines closer to the output will have a latency value that is less than a latency value of cut lines that are closer to the input of the circuit, etc. The resulting locations may then be ranked relative to one another in accordance with their costs and a least cost option may be selected from the ranked listing. The circuit may then be modified accordingly by inserting the authentication tag check logic at the inputs and the nullification logic at the identified intermediate location, which is selected based on the ranked costs of the locations. The modified circuit may then be used to process subsequent workloads as discussed above.

It should be appreciated that the cost function itself that is used to determine the costs of the minimal cut locations may take many different forms including a computation of the number of nodes in a cut of the circuit that would need to have the nullification operation applied to them, to a more computation involving the number of nodes as well as various cost factors based on the locations of the nodes within the circuit, e.g., nodes closer to the beginning of the circuit provide less security costs (or provide higher security) than nodes closer to the end of the circuit, however nodes closer to the beginning of the circuit introduce greater latency due to the nullification operation than nodes closer to the end of the circuit. A non-limiting example of a cost function may be of the type:

$$0.9*(\text{latency after nullifying/total latency}) + 0.1*(\text{total depth of the nullified nodes/number of nullified nodes*circuit depth})$$

The above involves latency and security, where security is measured using the depth of a node in the circuit.

As shown in FIG. 7A, there are two sub-circuits in the depicted circuit 700 with a first sub-circuit 710 being influenced by a first authentication indicator in1 and a second sub-circuit 720 being influenced by a second authentication indicator in2. The two sub-circuits 710 and 720 have an overlap due to the HE computation represented by the edges from node 712 to 722 and node 714 to 724. Thus, the input ciphertext associated with authentication indicator in1 influences both sub-circuits 710 and 720, whereas the ciphertext associated with authentication indicator in2 only influences the sub-circuit 720.

As shown in FIG. 7B, when evaluating the sub-circuits 710-720 affected by the ciphertext corresponding to authentication indicator in1, multiple possible minimal cut locations are identified, as represented in the figure by the dashed lines. That is, there are multiple locations 730-734 where the number of cuts necessary are 2 with some minimal cut lines being more/less secure, and some having larger/smaller chain indexes, which correlates to latency in the nullification operation. A table data structure 740 with each combination of authentication indicators may be generated and corresponding costs for each combination may be determined, where in this example, the costs are based on the number of ciphertexts that would need to be nullified at the minimal cut location. In this example of FIG. 7B, the minimal cut locations would require 2 ciphertexts to be nullified and thus, the cost is shown as 2 in the table data structure 740. The table data structure is populated with entries for each of the combinations of authentication indicators, as shown in FIGS. 7C-7D hereafter.

As shown in FIG. 7C, when evaluating the sub-circuit 720 affected by the ciphertext corresponding to the authentication indicator in2, a minimal cut analysis identifies the cut where a single ciphertext would need to be nullified to nullify the effect of an unauthenticated input ciphertext. Thus, the cost for nullifying the ciphertext associated with indicator in2 is 1, as shown in the second entry of table data structure 740. In addition, as it takes two nullifications for indicator in1 (entry 1 in the table 740) and 1 nullification for indicator in2 (entry 2 in the table 740), if one needs to nullify any of the sub-circuits 710-720 affected by the ciphertexts associated with indicators in1 or in2 (in1+in2), 3 nullifications would be required to ensure this nullification.

As shown in FIG. 7D, when evaluating a sub-circuit affected by ciphertexts associated with both authentication indicators in1 and in2 (in1∧in2), it is determined that two nullification operations are required and thus, there is a cost of 2, as shown in the fourth entry of the table data structure 740. Thus, with the illustrative embodiments shown in FIGS. 7A-7D, for every edge in the graph, a corresponding authentication indicator for the output ciphertext of that HE operation is determined. A table data structure is generated with the different subsets of the authentication indicators, e.g., in1, in2, in1+in2, in1/\in2. Then for each sub-circuit affected by one or more of the authentication indicators, a cost function is evaluated to identify the minimal cut locations in the graph, where this cost function may be a simple cost function based on the number of nullification operations that would be required, or a more complex cost function that comprises weighted configuration parameters directed to evaluating security and performance of the circuit based on the location of the nullification logic within the circuit. The minimal cuts based on the cost function evaluation are then returned and used to select a minimal cut location for insertion of nullification logic at the location of the selected minimal cut location. As noted previously, if not already represented in the weights and configuration parameters of the cost function, if there are multiple possible minimal cut locations, one may be selected based on an evaluation of the relevant performance and security considerations, e.g., is security is more important, then a minimal cut line closer to the inputs of the circuit may be selected and if latency is a primary concern, then a minimal cut line closer to the output of the circuit may be selected, for example.

Thus, the illustrative embodiments provide mechanisms for integrating authentication check capabilities, such as provided by AEAD tools or the like, in transciphering to provide an Authenticated Transciphering (AT) computing tool and computing tool operations/functionality. In some illustrative embodiments, the AT computing tool implements a combination of AEAD encryption and authentication key checks, with the security of input data afforded by HE mechanisms. This provides for an improved computing tool and improved computing tool operations/functionality that specifically addresses the problems of data security in distributed computing systems as previously mentioned above. That is the illustrative embodiments provide a specific computer tool solution that provides authentication of inputs while obfuscating the inputs during computations and providing the ability to nullify the results of such computations based on the authentication of the inputs. Thus, not only are the input ciphertexts authenticated, but the security of the inputs is maintained through HE, such that data leakage due to having to perform computations on decrypted data is avoided.

Figure 8:
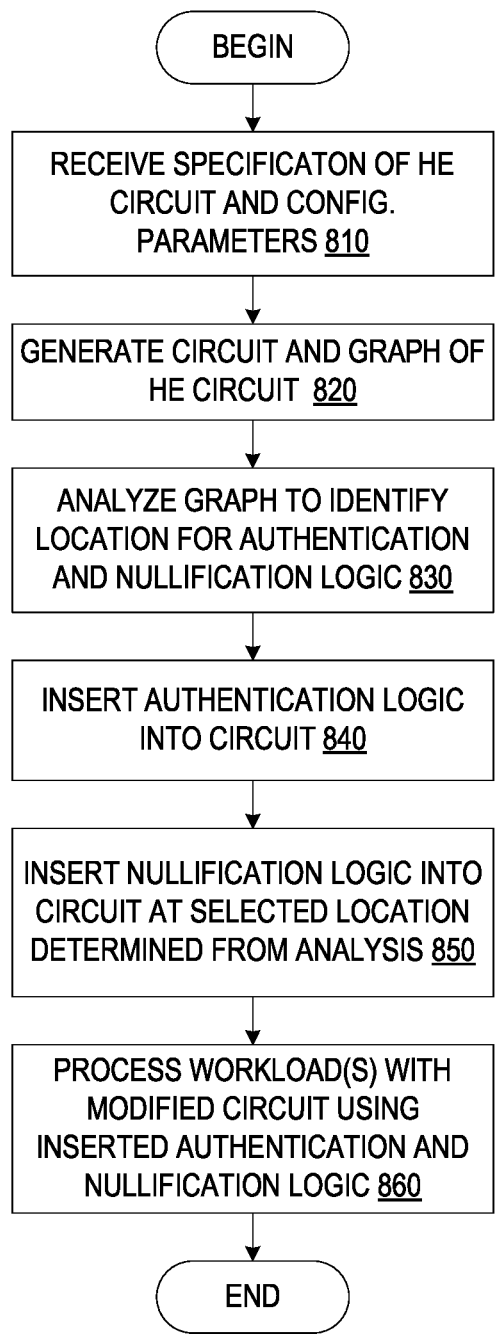
FIG. 8 is a flowchart outlining an example operation for performing Authentication Transciphering in accordance with one illustrative embodiment.

FIG. 8 is a flowchart outlining an example operation for performing Authentication Transciphering in accordance with one illustrative embodiment. It should be appreciated that the operations outlined in FIG. 8, as well as FIG. 11 hereafter, are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 8, and FIG. 11 hereafter, and may, in some cases, make use of the results generated as a consequence of the operations set forth in FIG. 8/FIG. 11, the operations in FIG. 8/FIG. 11 themselves are specifically performed by the improved computing tool in an automated manner.

As shown in FIG. 8, the operation starts by receiving a specification of a circuit for HE computations and configuration parameters for specifying priorities of performance/security parameters (step 810). The specification of the circuit is used to generate a graphical representation of the circuit with edges representing HE computations and nodes representing ciphertexts (step 820). The graph representation is analyzed based on the configuration parameters, in accordance with one or more of the illustrative embodiments described above, e.g., see FIGS. 3-7D, to identify a location of insertion of nullification logic to nullify ciphertexts that may be determined to be unauthenticated, i.e., their authentication tags cannot be matched to the ciphertexts and thus, the ciphertexts may have been tampered with, i.e., their integrity cannot be verified (step 830).

The results of the analysis are used to insert, into the circuit, authentication tag checking logic at the inputs, which operates on the AEAD encrypted input ciphertexts to determine if they are authenticated or not and set the value of an authentication indicator that is encrypted using HE (step 840). The results of the analysis are further used to insert nullification logic at the identified location in the circuit, where the nullification logic checks the status of one or more input authentication indicators for the input ciphertexts to an HE operation and if the authentication indicator(s) have a value indicating that the inputs are based on an upstream ciphertext that could not be authenticated, then the nullification operation is invoked to nullify the corresponding input ciphertext(s) to the HE operation (step 850). The modified circuit is then stored for later use during runtime operation.

Thereafter, during a runtime operation, the input ciphertext(s) of a workload are processed using the modified circuit corresponding to the user submitting the workload (step 860). The operation then terminates. Thus, the modified circuit implements the authentication checks of AEAD encryption mechanisms as the inputs, and provides for HE computations on HE encrypted ciphertexts while maintaining the ability to nullify the HE computations where necessary when input ciphertexts cannot be authenticated. The nullification operations may be located in the circuit at an appropriately selected location determined based on a consideration of security and performance parameters. Thus, an authentication transciphering is made possible with the improved computing tool and improved computing tool operations/functionality of the illustrative embodiments.

As noted above, the illustrative embodiments provide mechanisms that identify where nullification logic blocks are to be inserted in an HE circuit to provide for nullifying ciphertexts that may be determined to be unauthenticated. The actual nullification of these ciphertexts may take many different forms depending on the desired implementation. The following description provides examples of illustrative embodiments for implementing a nullification operation on ciphertexts determined to be unauthenticated. It should be appreciated that while the description is presented in the context of the mechanisms previously described above, the nullification operation may be used with other cryptographic mechanisms in order to nullify ciphertexts without departing from the spirit and scope of the present invention. Thus, the following description of nullification need not be used with the mechanisms for insertion of nullification logic blocks described previously, and may in fact be used with other mechanisms in which nullification of ciphertexts are desired.

Figure 9A:
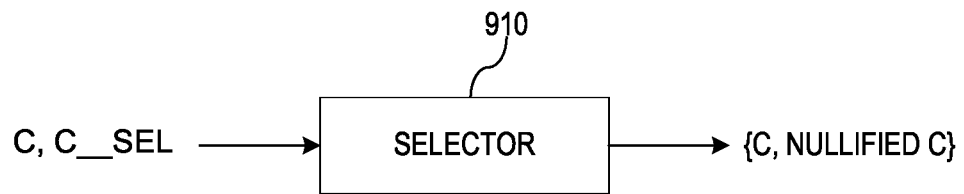
FIGS. 9A and 9B are example diagrams illustrating the nullification problem addressed by a nullification operation in accordance with one illustrative embodiments.
Figure 9B:
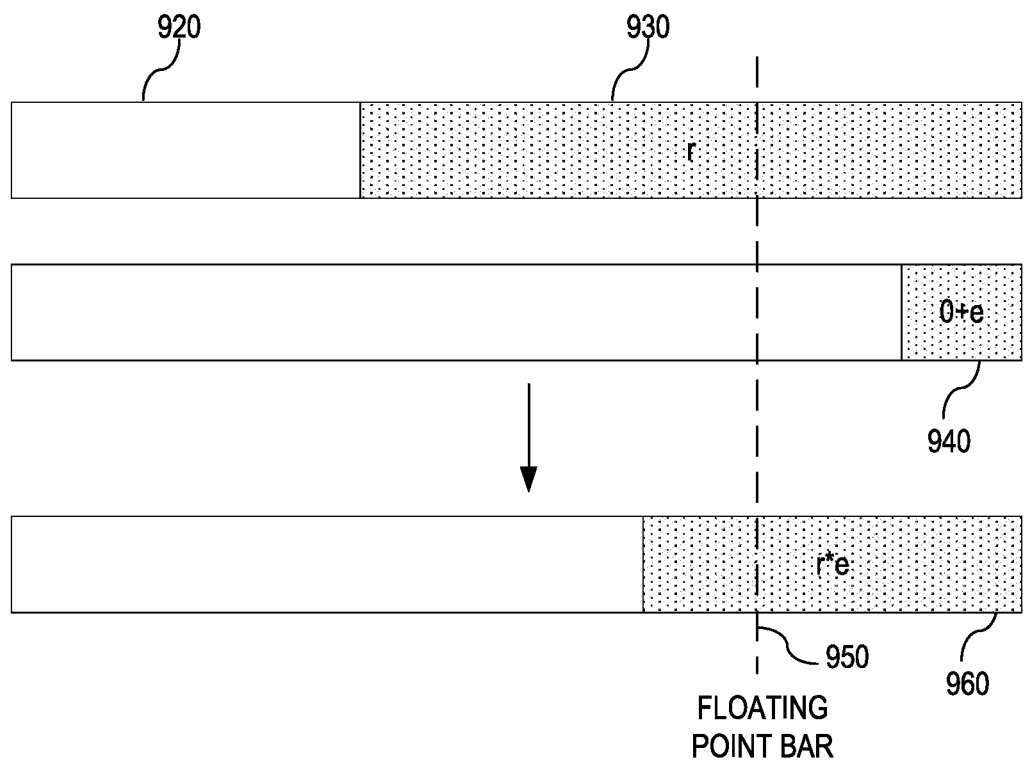

FIGS. 9A and 9B are example diagrams illustrating the nullification problem addressed by a nullification operation in accordance with one illustrative embodiments. As shown in FIG. 9A, the problem of nullifying a ciphertext determined to be unauthenticated may be characterized as an encrypted selector 910 with inputs of a ciphertext c and a selector value c_sel, where c_sel is an encrypted value of the selector cleartext value sel, i.e., an encrypted value of the unencrypted or cleartext message m, such that c_sel=HE.enc (sel).

The selector 910 is essentially a multiplexing function of the inputs that multiplies the input ciphertext with the selector value c_sel, which has a value of 0 or 1 and thus, outputs either the ciphertext (c) or nullifies the ciphertext (0) depending on whether the input ciphertext is determined to be authenticated or not. If the unencrypted message m(sel) is in the range [−e, e], where e is the error of the approximated HE encryption, then the encrypted selector 910 should return the ciphertext c. However, if the unencrypted message m(sel) is in the range [1−e, 1+e], then the selector 910 should return a random valid ciphertext, or a "null" value, both of which are considered nullifications of the ciphertext. Moreover, this selector 910 operation should be performed in an efficient manner.

With this characterization of the problem of the nullification operation, it can be appreciated that the encrypted ciphers, e.g., the AEAD ciphers, encrypt the message m based on a generated key k to generate a ciphertext c and integrity tag t, as discussed above. The decryption mechanism, e.g., the AEAD decryption mechanisms or the Authenticated Transciphering (AT) mechanisms above where the decryption belongs to the FHE scheme, decrypt the ciphertext c to generate the message m only if the tag t is determined to be valid, i.e., the selector 910 output is 0 (c_sel is in the range [−e, e]), and outputs a null result if the tag t is not valid, i.e., the selector 910 output is 1 (c_sel is in the range [1−e, 1+e]).

One way in which to perform the nullification operation of a ciphertext is to multiply the ciphertext by a large random value r, e.g., r∈[0, 264]. However, when the output of the selector 910 is 0, i.e., the tag t is valid and the ciphertext is authenticated, and when e is larger than a particular bound, e.g., e>$2^{-32}$, the result is an integer in [$2^{-32}$, $2^{32}$] which can destroy the value of the underlying plaintext message m. Only invalid values ciphertexts should be nullified, such as by adding the large random value to them. However, it is first necessary to "select" whether a ciphertext is valid or not (authenticated or unauthenticated). Thus, assuming that there is a selector 910 having a value of either 0 or 1, it is desirable to add the random number r to the data ciphertext c only in case the selector 910 value is 1. Thus, during the multiplexing operation of the selector 910, the selector 910 multiplies the random value r by the selector 910 value, e.g., 0 or 1, to get 0*r or 1*r. i.e., if c_sel=0, the selector 910 outputs c+0*r and if c_sel=1, the selector 910 outputs c+1*r, where the message m is destroyed.

FIG. 9B shows that this approach is not preferred when approximated homomorphic encryption is used because there is not a real encrypted selector c_sel which is exactly 0, instead c_sel 940 is 0 plus some error e. In that case the computation that is actually performed is not 0*r but (0+e)*r=r*e. If r 930 is large $2^{64}$ and e=$2^{-32}$ then this results in r*e=$2^{32}$ not equal to 0 as required, and then c+0*r not equal to c as expected. i.e., it is possible to destroy valid ciphertexts.

Again, the goal is to only nullifying unauthenticated or invalid cyphertexts, but because the data is encrypted with FHE, it cannot be known at the server side if a ciphertext is authenticated. Moreover, an oblivious algorithm should only be applied that performs the same operations (with different values) on the input ciphertexts whether they are valid or not.

For the example in FIG. 9B, assume a fixed point integer of 32 bits in which a floating point (FP) number may be inserted, e.g., 34.56 where 34 lies in the area 930 to the left to the FP bar 950 and 56 lies on the right of the FP bar 950 in this area 930. The FP number can be seen as 0x03456000 where the FP bar 950 is after the third digit from the left. The white zones 920 are the zero padding of the fixed point elements.

In FIG. 9B, r 930 is a random value that does not necessarily has digits in the MSB of the fixed number container, that is why it has a white padding of zeros 920. On the other hand, 0 translates to 0x0000000 and when considering the small encryption error e, e.g., 3, the resulting value 0x00000003 is obtained, which is on the right of the FP bar 950, i.e., 940 in FIG. 9B. When multiplying the two values 930 and 940, the result is 960 which crosses the FP bar 950. Thus, if this value is added to any other valid value, e.g., a valid ciphertext c, the valid value will be destroyed. Thus, in order to avoid destroying the real value of the ciphertext c, rather than multiplying by a large random value, the multiplication used to perform the nullification operation in accordance with the illustrative embodiments is performed in stages.

The nullification logic of the illustrative embodiments, operates by generating a random number represented in bits. Every bit of the random number is shifted to its right location using a series of scalar multiplications and square operations to generate a random mask. The scalar multiplications are very low latency operations, i.e., negligible latency operations, in homomorphic encryption. The squaring operations reduce the error while placing the bits of the random number in the proper location for nullification of the ciphertext.

For example, assume r=sum_{i=1}{n}{$2^i$*r_i}. Now consider the following example, where r=01101 in binary representation, such that r0=1, r1=0, r2=1, r3=1, and r4=0. It is needed to take the bits r0-r4 and place them in the right location. By multiplying them by $2^i$ the bits are move as follows: r0=1, 2*r1=0, 4*r2=100, 8*r3=1000, and 16*=r4=0. Summing the results, one obtains 01101 in binary.

The random mask is then added to the ciphertext c and the ciphertext c with the added random mask and the selection value (sel) are returned. If a fixed point element is required (and not an integer) the fractional part is generated uniformly at random, multiplied by the unencrypted message m, and added to the ciphertext c as well. While the illustrative embodiments are described as "nullifying" the unauthenticated ciphertexts c, in practice a ciphertext c with some value still needs to be returned after decryption. The nullification could of course return 0, however, in many applications, the value 0 is also a valid message and, due to the error of the encryption scheme, the decryption results will be 0+c, which can leak information on the unauthenticated data. Instead, in accordance with some illustrative embodiments, the "nullifying" is achieved by converting the value such that it appears random and thus, nothing can be learned from observing the returned value. Thus, rather than returning 0, the nullification operation returns random data, that is equivalent theoretically to a null value.

The solution provided by the nullification operation and nullification logic of the illustrative embodiments has a multiplication depth of approximately 2 for generating the random mask. When using single instruction multiple data (SIMD) processing, as small as two multiplications may be executed to perform the nullification operation of the illustrative embodiments. For example, in the algorithm shown in FIG. 10, discussed hereafter, the manipulations in lines 4.1.1 and 4.2 are independent and can be computed in parallel using SIMD processing. The square operation requires one multiplication and $f(x)=x^4$ requires two (two squares), so together with $r*m$ there is either 2 or 3 multiplications depending on the inputs.

FIG. 10 is an example diagram illustrating one implementation of a nullification logic of nullification logic blocks that may be inserted into an HE circuit in accordance with one illustrative embodiment. As shown in FIG. 10, in the depicted logic the value n is the number of bits required to cover (hide) the data in case it needs to be masked out, e.g., 64, 128, etc. The value e is the encryption error added to the encrypted selector, e.g., $2^{-30}$, where the error is determined according to the FHE scheme parameters, e.g., the scale. The value c is the ciphertext that is to be masked and the value m is the output of the selector in [−e, e] or [1−c, 1+c].

In line 1 of the main block of the nullification logic, a random value is generated having n uniform random bits and stored as the value r. This random value is then multiplied by the selector output m in line 2 of the main block and stored as value r. A masked r value, $r_{masked}$, is calculated in line 3 of the main block, as the bit 0 value of the random value r summed with twice the bit 1 value of the random value r, i.e., $r_{masked}=r[0]+2r[1]$. Here, the algorithm is starting to construct r from its bits and the first two bits do not require a ciphertext-ciphertext multiplication, thus the algorithm can simply add them. In later steps, the rest of the bits are accumulated one by one.

In line 4, for each bit from bit 2 to bit n, the operation shown in the loop are performed. In line 1 of the loop, if the current bit i is less than a predetermined value determined according to the value of e, e.g., a value of 12 in the depicted example, then the value of the bit is set to the value shown in line 1 of the if condition, i.e., $bit=(2|i|/|2|\cdot r[i])^2$. In line 2 of the if condition, if(i mod 2): bit=2 bit.

For example, let $e=2^{-5}$, let $r_i=0+2^{-6}$, and let i=6. At line 4.1.1, the algorithm computes $(2^3*(0+2^{-6}))^2=(2^{-3})^2=0+2^{-6}$. In that case, the algorithm generates a value that is close to 0, less than the error bound e, which is what is wanted. However, if i=16, then at line 4.1.1 the algorithm computes $(2^8*(0+2^{-6}))^2=(2^2)^2=0+2^4=16$, which is no longer 0. In this case the algorithm goes to line 4.2 and computes $bit=2^(16-4*4)*(2^4*2^{-6})^4=1*(2^{-2})^4=2^{-16}$, which is almost 0 as needed. Thus, when $(2^(i/2)*e)^2<e$, then the results will be less then e as is desired.

In line 2 of the for loop of line 4, if i is not less than 12, then the bit value is set to $2^{i-4|i|/|4|}\cdot(2^{|i|/|4|}\cdot r[i])^4$. To further explain why the bits are set to these various values, consider that it is desirable to compute $2^i*x$, but if x=0 the results may be too large (bigger than e). Instead, the algorithm uses the square root and cubing of the value. This maintains the results low when x=0. When this is not enough to maintain the results low, the algorithm repeats the process recursively performing cube(cube(sqrt(sqrt(x)))) to achieve the same goal. The algorithm still however, needs to handle cases where i is not even or is not a multiplication of 4, e.g., what happens for i=3? This is why the floor (rounding operations) are utilized.

In line 3 of the for loop of line 4, the bit is added to $r_{masked}$. This operation is performed for each of the bits i from 2 to n. The result is the multiplexed random which is a combination of the ciphertext c and the mask value $r_{masked}$.

Figure 11:
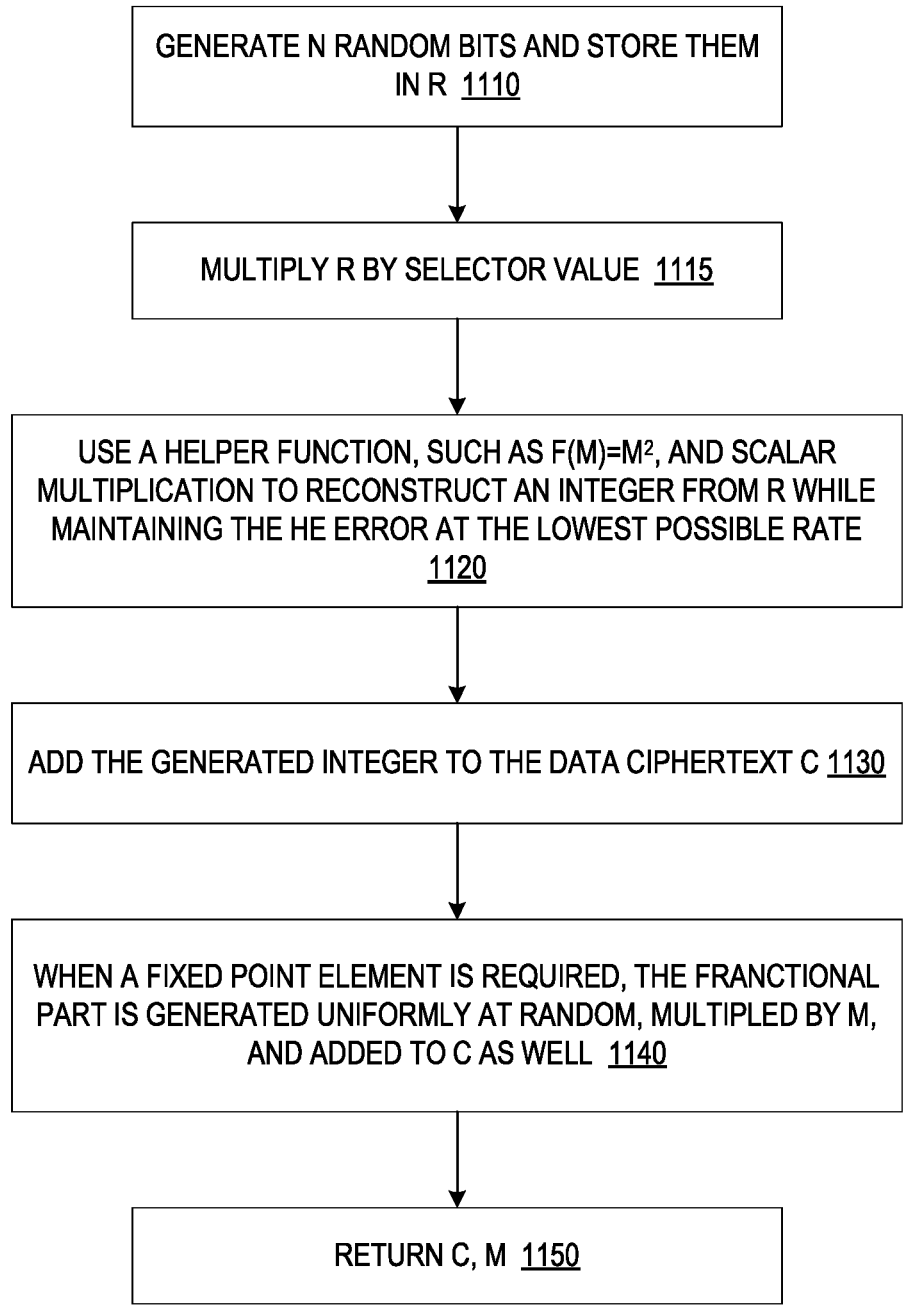
FIG. 11 is a flowchart outlining a nullification operation in accordance with one illustrative embodiment.

FIG. 11 is a flowchart outlining a nullification operation in accordance with one illustrative embodiment. As discussed previously with regard to the flowchart in FIG. 8, it should be appreciated that the operations outlined in FIG. 11 are specifically performed automatically by an improved computer tool of the illustrative embodiments and are not intended to be, and cannot practically be, performed by human beings either as mental processes or by organizing human activity. The operations in FIG. 11 themselves are specifically performed by the improved computing tool, and specifically the inserted nullification logic in a HE circuit, in an automated manner without human intervention.

As shown in FIG. 11, the operation starts by generating n random bits and storing them in the random value r (step 1110). This operation is represented in the example logic of FIG. 10 in line 1 of the main block. The random value r is multiplied by the selector (step 1115). This operation is represented in the example logic of FIG. 10 in line 2 of the main block.

A helper function, such as $f(m)=m^2$ or the like, and scalar multiplication is used to construct an integer from r while maintaining the HE error low, i.e., maintaining the accuracy (step 1120). This step corresponds to lines 3-4 in FIG. 10 for example. In general, the helper function may be a quadratic symmetric polynomial function that goes through the origin. The reason is that it takes low values that are in the neighborhood of 0 ([−e, e]) and getting them closer to 0, e.g., squaring $2^{-6}$ will result is $2^{-12}$. For example, in some illustrative embodiments a helper function may be $f(x)=x^4$ such that $f(2^{-6})=2^{-24}$.

The generated integer, $r_{masked}$ is added to the ciphertext c (step 1130). This may correspond to line 5 of the main block in FIG. 10. When a fixed point element is required (and not an integer) the fractional part is generated uniformly at random, multiplied by the selector output value m, and then added to c as well (step 1140). The value of the ciphertext and the selector output value m are then returned (step 1150). The operation of the nullification logic then terminates.

It should be appreciated that the return of the ciphertext and selector output value allows the decryption mechanism to determine whether to ignore a ciphertext or not. That is, the data is encrypted so it is not known whether it was nullified or not. For example, assume that the original value was 15 and after masking, it becomes 50. The decryption mechanisms do not know whether 50 is the original or the masked value. Thus, the illustrative embodiments also return selector output value so that the decryption mechanisms can ignore bad values, i.e., masked values.

It should also be noted that the same process as shown in the algorithm of FIG. 10 and flowchart of FIG. 11 may be used where the random value 4_masked is constructed from bits of r to build every number n from its binary bits omitting the mask/selector input or treating it as 1. For example, the AEAD ciphertext may be represented in bits and after conversion to an HE ciphertext, the mechanisms of the illustrative embodiments may construct the original value, e.g., integer, FP32, FP16, etc. from the relevant bits.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, the method comprising:
   receiving a specification of a homomorphic encryption (HE) operation to be performed on one or more workloads comprising one or more input ciphertexts;
   generating a circuit of HE computations for performing the HE operation, wherein the circuit comprises authentication tag checking logic at one or more inputs of the circuit, and nullification logic inserted into the circuit wherein the nullification logic operates to delete ciphertext that has an invalid authentication tag;
   processing the one or more workloads by the circuit of HE computations to generate one or more output ciphertexts that are results of the HE operation executed on the one or more input ciphertexts; and
   returning the one or more output ciphertexts to a source computing system of the one or more workloads, wherein the output ciphertext are associated with the input ciphertexts with valid authentication tags.

2. The method of claim 1, wherein the one or more workloads are authenticated transciphering workloads comprising a data encryption that involves conversion of ciphertexts from a first type of cipher to a different second type of cipher.

3. The method of claim 2, wherein the first type of cipher is an Authenticated Encryption with Associated Data (AEAD) cipher and second type of cipher is a homomorphic encryption (HE) cipher, and wherein the one or more input ciphertexts are AEAD ciphertexts converted to HE ciphertexts, and wherein processing the one or more workloads by the circuit of the HE computations comprises processing the HE ciphertexts.

4. The method of claim 3, wherein: the workloads include one or more authentication tags associated with the one or more input ciphertexts, an encrypted indicator is generated for each input ciphertext and associated authentication tag and is bound to a corresponding HE ciphertext, and the encrypted indicator is included in the HE computations performed by the circuit of HE computations.

5. The method of claim 4, wherein the HE computations are modified to perform computations based on the encrypted indicators, wherein: for an HE ADD computation that adds two HE ciphertexts, the HE ADD computation is modified to perform an AND operation on the encrypted indicators associated with the two HE ciphertexts, for an HE MUL computation that multiplies the two HE ciphertexts, the HE MUL computation is modified to perform an AND operation on the encrypted indicators associated with the two HE ciphertexts, and for a HE Rot computation that performs a rotation on a HE ciphertext, the HE Rot computation is modified to perform a HE Rot computation on the encrypted indicator.

6. The method of claim 1, wherein the masked input ciphertext is masked based on a random value and a helper function that operate on the input ciphertext that cannot be authenticated to generate a masked input ciphertext.

7. The method of claim 1, wherein the specification of the HE operation comprises a graph having nodes representing HE ciphertexts and edges representing HE computations.

8. The method of claim 1, wherein generating the circuit of HE computations for performing the HE operation further comprises: receiving configuration parameters specifying tradeoff parameter settings for evaluating a cost function for determining a location to insert the nullification logic into the circuit; configuring the cost function based on the tradeoff parameter settings specified in the received configuration parameters; evaluating the configured cost function for a plurality of locations of the circuit; and selecting a location from the plurality of locations of the circuit based on results of evaluating the configured cost function for the plurality of locations.

9. The method of claim 8, wherein the tradeoff parameter settings comprise settings associated with preferences for security and latency preferences which are used to weight elements of the cost function when selecting between a plurality of locations for insertion of the nullification logic, and wherein tradeoff parameter settings preferring security cause a location relatively closer to a front of the HE circuit to be selected, wherein tradeoff parameter settings preferring lower latency cause a location relatively closer to an end of the HE circuit to be selected.

10. The method of claim 1, wherein the receiving and generating operations are performed as part of an offline process of a cloud provider in response to a user of the source computing system requesting the cloud provider provide the HE operation, and wherein the processing and returning are performed as part of an online process of the cloud provider after deploying the HE circuit for use by the user.

11. A computer program product comprising a computer readable storage medium having a computer readable program stored therein, wherein the computer readable program, when executed on a computing device, causes the computing device to:
   receive a specification of a homomorphic encryption (HE) operation to be performed on one or more workloads comprising one or more input ciphertexts;
   generate a circuit of HE computations for performing the HE operation, wherein the circuit comprises authentication tag checking logic at one or more inputs of the circuit, and nullification logic inserted into the circuit, wherein the nullification logic operates to delete ciphertext that has an invalid authentication tag;
   process the one or more workloads by the circuit of HE computations to generate one or more output ciphertexts that are results of the HE operation executed on the one or more input ciphertexts; and
   return the one or more output ciphertexts to a source computing system of the one or more workloads, wherein the output ciphertext are associated with the input ciphertexts with valid authentication tags.

12. The computer program product of claim 11, wherein the one or more workloads are authenticated transciphering workloads comprising a data encryption that involves conversion of ciphertexts from a first type of cipher to a different second type of cipher.

13. The computer program product of claim 12, wherein the first type of cipher is an Authenticated Encryption with Associated Data (AEAD) cipher and second type of cipher is a homomorphic encryption (HE) cipher, and wherein the one or more input ciphertexts are AEAD ciphertexts converted to HE ciphertexts, and wherein processing the one or more workloads by the circuit of the HE computations comprises processing the HE ciphertexts.

14. The computer program product of claim 13, wherein: the workloads include one or more authentication tags associated with the one or more input ciphertexts, an encrypted indicator is generated for each input ciphertext and associated authentication tag and is bound to a corresponding HE ciphertext, and the encrypted indicator is included in the HE computations performed by the circuit of HE computations.

15. The computer program product of claim 14, wherein the HE computations are modified to perform computations based on the encrypted indicators, wherein: for an HE ADD computation that adds two HE ciphertexts, the HE ADD computation is modified to perform an AND operation on the encrypted indicators associated with the two HE ciphertexts, for an HE MUL computation that multiplies the two HE ciphertexts, the HE MUL computation is modified to perform an AND operation on the encrypted indicators associated with the two HE ciphertexts, and for a HE Rot computation that performs a rotation on a HE ciphertext, the HE Rot computation is modified to perform a HE Rot computation on the encrypted indicator.

16. The computer program product of claim 11, wherein the masked input ciphertext is masked based on a random value and a helper function that operate on the input ciphertext that cannot be authenticated to generate a masked input ciphertext.

17. The computer program product of claim 11, wherein the specification of the HE operation comprises a graph having nodes representing HE ciphertexts and edges representing HE computations.

18. The computer program product of claim 11, wherein generating the circuit of HE computations for performing the HE operation further comprises: receiving configuration parameters specifying tradeoff parameter settings for evaluating a cost function for determining a location to insert the nullification logic into the circuit; configuring the cost function based on the tradeoff parameter settings specified in the received configuration parameters; evaluating the configured cost function for a plurality of locations of the circuit; and selecting a location from the plurality of locations of the circuit based on results of evaluating the configured cost function for the plurality of locations.

19. The computer program product of claim 18, wherein the tradeoff parameter settings comprise settings associated with preferences for security and latency preferences which are used to weight elements of the cost function when selecting between a plurality of locations for insertion of the nullification logic, and wherein tradeoff parameter settings preferring security cause a location relatively closer to a front of the HE circuit to be selected, wherein tradeoff parameter settings preferring lower latency cause a location relatively closer to an end of the HE circuit to be selected.

20. An apparatus comprising:
at least one processor; and
at least one memory coupled to the at least one processor, wherein the at least one memory comprises instructions which, when executed by the at least one processor, cause the at least one processor to:
receive a specification of a homomorphic encryption (HE) operation to be performed on one or more workloads comprising one or more input ciphertexts;
generate a circuit of HE computations for performing the HE operation, wherein the circuit comprises authentication tag checking logic at one or more inputs of the circuit, and nullification logic inserted into the circuit, wherein the nullification logic operates to delete ciphertext that has an invalid authentication tag;
process the one or more workloads by the circuit of HE computations to generate one or more output ciphertexts that are results of the HE operation executed on the one or more input ciphertexts; and
return the one or more output ciphertexts to a source computing system of the one or more workloads, wherein the output ciphertext are associated with the input ciphertexts with valid authentication tags.

* * * * *